US010826550B2

(12) United States Patent
Choi et al.

(10) Patent No.: US 10,826,550 B2
(45) Date of Patent: Nov. 3, 2020

(54) ELECTRONIC DEVICE AND METHOD FOR MANAGING SPECIFIC ABSORPTION RATE

(71) Applicant: Samsung Electronics Co., Ltd., Gyeonggi-do (KR)

(72) Inventors: Hyun-Suk Choi, Daegu (KR); Jae-Ahn Ryu, Gyeongsangbuk-do (KR); Hyun-Tae Jung, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 596 days.

(21) Appl. No.: 15/381,740

(22) Filed: Dec. 16, 2016

(65) Prior Publication Data
US 2017/0250718 A1 Aug. 31, 2017

(30) Foreign Application Priority Data
Feb. 29, 2016 (KR) .......................... 10-2016-0024626

(51) Int. Cl.
*H04W 52/18* (2009.01)
*H04B 1/3827* (2015.01)
*H04W 52/36* (2009.01)

(52) U.S. Cl.
CPC .......... *H04B 1/3838* (2013.01); *H04W 52/18* (2013.01); *H04W 52/36* (2013.01)

(58) Field of Classification Search
None
See application file for complete search history.

(56) References Cited

U.S. PATENT DOCUMENTS

| 8,326,385 | B2 * | 12/2012 | Brogle | G01D 5/2405 |
| | | | | 455/522 |
| 8,452,321 | B2 * | 5/2013 | Fodor | H04W 52/367 |
| | | | | 455/522 |
| 8,995,938 | B2 * | 3/2015 | Ali | H04B 1/3838 |
| | | | | 455/127.1 |
| 9,054,780 | B2 * | 6/2015 | Wilson | H04W 52/146 |
| 9,237,531 | B2 * | 1/2016 | Lu | H04W 52/367 |
| 9,531,420 | B1 * | 12/2016 | Prendergast | H04B 1/3838 |
| 9,621,211 | B2 * | 4/2017 | Shi | H04B 1/3838 |
| 9,655,056 | B2 * | 5/2017 | Hao | H04W 52/04 |
| 9,774,361 | B2 * | 9/2017 | Hong | H04W 52/267 |

(Continued)

*Primary Examiner* — Tuan A Tran
(74) *Attorney, Agent, or Firm* — The Farrell Law Firm, P.C.

(57) ABSTRACT

The present disclosure provides an electronic device and a method of operating an electronic device. The electronic device includes a housing; a wireless communication circuit positioned inside the housing; a battery positioned inside the housing; a display exposed through a part of the housing; and a processor positioned inside the housing and electrically connected to at least one of the wireless communication circuit, the battery, and the display, wherein the processor is configured to collect at least one piece of state information that indicates a state of a user, determine at least one piece of specific absorption rate (SAR) characteristic information, which is related to a SAR, based on collected state information, confirm communication power information corresponding to the determined at least one piece of SAR characteristic information, and adjust communication power of the wireless communication circuit based on confirmed communication power information.

7 Claims, 35 Drawing Sheets

(56) References Cited

U.S. PATENT DOCUMENTS

| | | | |
|---|---|---|---|
| 10,013,038 B2* | 7/2018 | Mercer | ............... H04W 52/367 |
| 2012/0002995 A1 | 1/2012 | Choi et al. | |
| 2012/0077538 A1 | 3/2012 | Yun | |
| 2012/0206556 A1 | 8/2012 | Yu et al. | |
| 2013/0172045 A1 | 7/2013 | Caballero et al. | |
| 2013/0331046 A1* | 12/2013 | Hawaka | ................ H04W 52/18 |
| | | | 455/127.1 |

* cited by examiner

2014
May

| | | |
|---|---|---|
| 🍎 Blood glucose<br>Monday, 5@ AM 8:19 | 156 mg/dL | ◯ |
| ❤ Pulse<br>Monday, 5@ AM 8:16 | 70 bpm | ◯ |
| Blood pressure<br>Monday, 5@ AM 8:16 | 122/87 mm Hg | ◯ |
| Body fat<br>Monday, 5@ AM 8:15 | 22.0 % | ◯ |
| Weight<br>Monday, 5@ AM 8:15 | 78.1 kg | ◯ |
| BMI: body mass index | 17 $kg/m^2$ | ◯ |
| Bone density | 200 $mg/cm^2$ | ◯ |
| Blood lead level | 40 µg/dℓ | ◯ |
| Blood pressure<br>Sunday, 4@ AM 5:30 | 113/80 mm Hg | ◯ |

FIG.11

| SAR CHARACTERISTIC INFORMATION | | CHARACTERISTIC VALUE RANGE (EQUAL TO OR LARGER THAN~LESS THAN) | LEVEL |
|---|---|---|---|
| A | BODY MASS | 0 ~ 10 | 1 |
| | | 10 ~ 15 | 2 |
| | | 15 ~ 20 | 3 |
| | | ... | ... |
| B | BONE DENSITY | 0 ~ 100 | 1 |
| | | 100 ~ 200 | 2 |
| | | 200 ~ 300 | 3 |
| | | ... | ... |
| C | BLOOD LEAD LEVEL | 0 ~ 10 | 1 |
| | | 15 ~ 30 | 2 |
| | | 30 ~ 45 | 3 |
| | | ... | ... |
| ... | ... | ... | ... |

FIG.12

| CALCULATION RESULT RANGE (EQUAL TO OR LARGER THAN~LESS THAN) | TYPE GRADE | COMMUNICATION POWER INFORMATION |
|---|---|---|
| 1 ~ 5 | 1 | FIRST TABLE |
| 5 ~ 10 | 2 | SECOND TABLE |
| 10 ~ 15 | 3 | THIRD TABLE |
| ... | ... | ... |

FIG.13

| CALCULATION RESULT RANGE (EQUAL TO OR LARGER THAN~LESS THAN) | TYPE GRADE | TYPE LEVEL | COMMUNICATION POWER INFORMATION |
|---|---|---|---|
| 1 ~ 1.0 | 1 | 1 | FIRST TABLE |
| 1.0 ~ 2.0 | | 2 | SECOND TABLE |
| 2.0 ~ 3.0 | | 3 | THIRD TABLE |
| 3.0 ~ 4.0 | | 4 | FOURTH TABLE |
| 4.0 ~ 5.0 | | 5 | FIFTH TABLE |
| 5.0 ~ 6.0 | 2 | 1 | SIXTH TABLE |
| 6.0 ~ 7.0 | | 2 | SEVENTH TABLE |
| 7.0 ~ 8.0 | | 3 | EIGHT TABLE |
| 8.0 ~ 9.0 | | 4 | NINTH TABLE |
| 9.0 ~ 10.0 | | 5 | TENTH TABLE |
| 10.0 ~ 11.0 | 3 | 1 | ELEVENTH TABLE |
| 11.0 ~ 12.0 | | 2 | TWELFTH TABLE |
| 12.0 ~ 13.0 | | 3 | THIRTEENTH TABLE |
| 13.0 ~ 14.0 | | 4 | FOURTEENTH TABLE |
| 14.0 ~ 15.0 | | 5 | FIFTEENTH TABLE |
| ... | ... | ... | ... |

FIG.14

| | SAR (W/kg) | COMMUNICATION SCHEME | TX FREQUENCY BAND (hz) | COMMUNICATION POWER INFORMATION | APP THAT IS BEING EXECUTED | CONTENT THAT IS BEING EXECUTED | ... |
|---|---|---|---|---|---|---|---|
| FIRST WEARABLE DEVICE | 2.01 | WiFi | 2.4G | THIRD TABLE | MUSIC PLAYER | Music | ... |
| SECOND WEARABLE DEVICE | 1.47 | BT | 2.4G | FIRST TABLE | HEALTH CARE | – | ... |
| | ... | ... | ... | ... | ... | ... | ... |
| ELECTRONIC DEVICE | 2.13 | LTE | 7G | FOURTH TABLE | CALL | ... | ... |

FIG.23

| SAR CHARACTERISTIC INFORMATION | | CHARACTERISTIC VALUE RANGE | LEVEL |
|---|---|---|---|
| A | SAR VALUE | 0 EQUAL TO OR LARGER THAN ~ 1.0 LESS THAN | 1 |
| | | 1.0 EQUAL TO OR LARGER THAN ~ 2.0 LESS THAN | 2 |
| | | 2.0 EQUAL TO OR LARGER THAN ~ 3.0 LESS THAN | 3 |
| | | ... | ... |
| B | COMMUNICATION SCHEME | WiFi | 1 |
| | | BT | 2 |
| | | LTE | 3 |
| | | ... | ... |
| C | TX FREQUENCY BAND | 2.4G | 1 |
| | | 5G | 2 |
| | | 7G | 3 |
| ... | ... | ... | ... |

FIG.24

| | SAR | COMMUNICATION SCHEME | DUPLEXING SCHEME | TX FREQUENCY BAND | COMMUNICATION SCHEDULE INFORMATION | APP THAT IS BEING EXECUTED | CONTENT THAT IS BEING EXECUTED |
|---|---|---|---|---|---|---|---|
| ELECTRONIC DEVICE | 2.01 | LTE | FDD | 2.5G~2.57G | FOURTH TABLE | CALL | - |
| FIRST WEARABLE DEVICE | 2.01 | WiFi | TDD | 2.4G | THIRD TABLE | MUSIC PLAYER | MUSIC |
| SECOND WEARABLE DEVICE | 1.47 | BT | TDD | 2.4G | FOURTEENTH TABLE | HEALTH CARE | - |
| ⋮ | ⋮ | ⋮ | ⋮ | ⋮ | ⋮ | ⋮ | ⋮ |

FIG.31

ELECTRONIC DEVICE AND METHOD FOR MANAGING SPECIFIC ABSORPTION RATE

PRIORITY

This application claims priority under 35 U.S.C. § 119(a) to a Korean Patent Application filed on Feb. 29, 2016 in the Korean Intellectual Property Office and assigned Serial No. 10-2016-0024626, the entire content of which is incorporated herein by reference.

BACKGROUND

1. Field of the Disclosure

The present disclosure relates generally to management of a specific absorption rate (SAR), and more particularly, to management of a SAR for a user related to a wearable device worn by the user, and a SAR resulting from communication between an electronic device and at least one external device.

2. Description of the Related Art

In general, an electronic device, such as a mobile communication device, may provide not only voice communication, while securing a user's mobility, but also a high-speed data communication service. Such a mobile communication device performs communication not only with another mobile communication device, such as a smartphone, but also with a wearable device, such as a watch or eyeglasses, or with an Internet-of Things (IoT) device, such as a TV set or a lamp; as a result, the communication service environments are gradually expanding.

Such an expansion of communication service environments is followed by regulations regarding the SAR of electronic devices. The SAR values of electronic devices are regulated using the following SAR improvement methods: changing the antenna structure, attaching a reflecting material at the point of peak power, using a shielding or absorbing body, changing the ground point of the antenna, or reducing the conduction power.

There has recently been much interest not only on methods for regulating SAR values in view of SAR values that depend on individual differences among users, but also on methods for regulating SAR values related to wearable devices, which are worn by users, or methods for regulating SAR values that result from communication between a user's electronic device and at least one external device.

Therefore, there is a need for a method for managing not only the SAR for each user, but also the SAR related to a wearable device, which is worn by the user, and the SAR resulting from communication between an electronic device and at least one external device.

SUMMARY

An embodiment of the present disclosure may provide an electronic device and a method for managing a SAR.

An aspect of the present embodiments includes a SAR value, which follows the communication power of an electronic device, and which may be adjusted in view of SAR suitability for each individual user.

Another aspect of the present embodiments includes adjusting the SAR value for each individual user, which follows overlapping of communication power of an electronic device and communication power resulting from at least one external device.

Another aspect of the present embodiments includes confirming peripheral users, who are influenced by the SAR, and assigning different weights to the confirmed peripheral users, thereby adjusting the communication power for each peripheral user, such that the SAR value for each individual user may be adjusted.

In accordance with an aspect of the present disclosure, an electronic device is provided. The electronic device includes a housing; a wireless communication circuit positioned inside the housing; a battery positioned inside the housing; a display exposed through a part of the housing; and a processor positioned inside the housing and electrically connected to at least one of the wireless communication circuit, the battery, and the display, wherein the processor is configured to collect at least one piece of state information that indicates a state of a user, determine at least one piece of SAR characteristic information, which is related to a SAR, based on at least one piece of collected state information, confirm communication power information corresponding to the determined at least one piece of SAR characteristic information, and adjust communication power of the wireless communication circuit based on confirmed communication power information.

In accordance with another aspect of the present disclosure, an electronic device is provided. The electronic device includes a housing; a wireless communication circuit positioned inside the housing; a battery positioned inside the housing; a display exposed through a part of the housing; and a processor positioned inside the housing and electrically connected to at least one of the wireless communication circuit, the battery, and the display, wherein the processor is configured to collect at least one piece of device information from at least one external device, collect at least one piece of device information regarding the electronic device, determine SAR characteristic information, which is related to a SAR, based on the at least one piece of received device information regarding the at least one external devices and the at least one piece of collected device information regarding the electronic device, confirm communication power information corresponding to the determined SAR characteristic information, and adjust communication power regarding the electronic device and communication power regarding the at least one external device based on confirmed communication power information.

In accordance with another aspect of the present disclosure, a method of operating an electronic device is provided. The method includes receiving at least one piece of device information from at least one external device; collecting at least one piece of device information regarding the electronic device; determining radiation characteristic information, which is related to signal radiation, based on the at least one piece of received device information regarding the at least one external device and the at least one piece of collected device information regarding the electronic device; confirming communication schedule information corresponding to the determined radiation characteristic information; and adjusting a communication schedule regarding the electronic device and a communication schedule regarding the at least one external devices based on the confirmed communication schedule information.

BRIEF DESCRIPTION OF THE DRAWINGS

The above and other aspects, features, and advantages of the present disclosure will be more apparent from the following detailed description taken in conjunction with the accompanying drawings, in which:

FIG. 11 is a diagram illustrating a screen that provides health information in connection with a health care application according to an embodiment of the present disclosure;

FIG. 12 is a diagram illustrating SAR characteristic-wise level setting information according to an embodiment of the present disclosure;

FIG. 13 is a diagram illustrating SAR grade-wise communication power setting information according to an embodiment of the present disclosure;

FIG. 14 is a diagram illustrating SAR grade-related level-wise communication power setting information according to an embodiment of the present disclosure;

FIG. 23 is a diagram of SAR characteristic information regarding at least one external device and an electronic device according to an embodiment of the present disclosure;

FIG. 24 is a diagram of SAR characteristic-wise level setting information according to an embodiment of the present disclosure;

FIG. 31 is a diagram illustrating radiation characteristic information regarding an electronic device and at least one external device according to an embodiment of the present disclosure;

DETAILED DESCRIPTION OF EMBODIMENTS OF THE PRESENT DISCLOSURE

Figure 1:
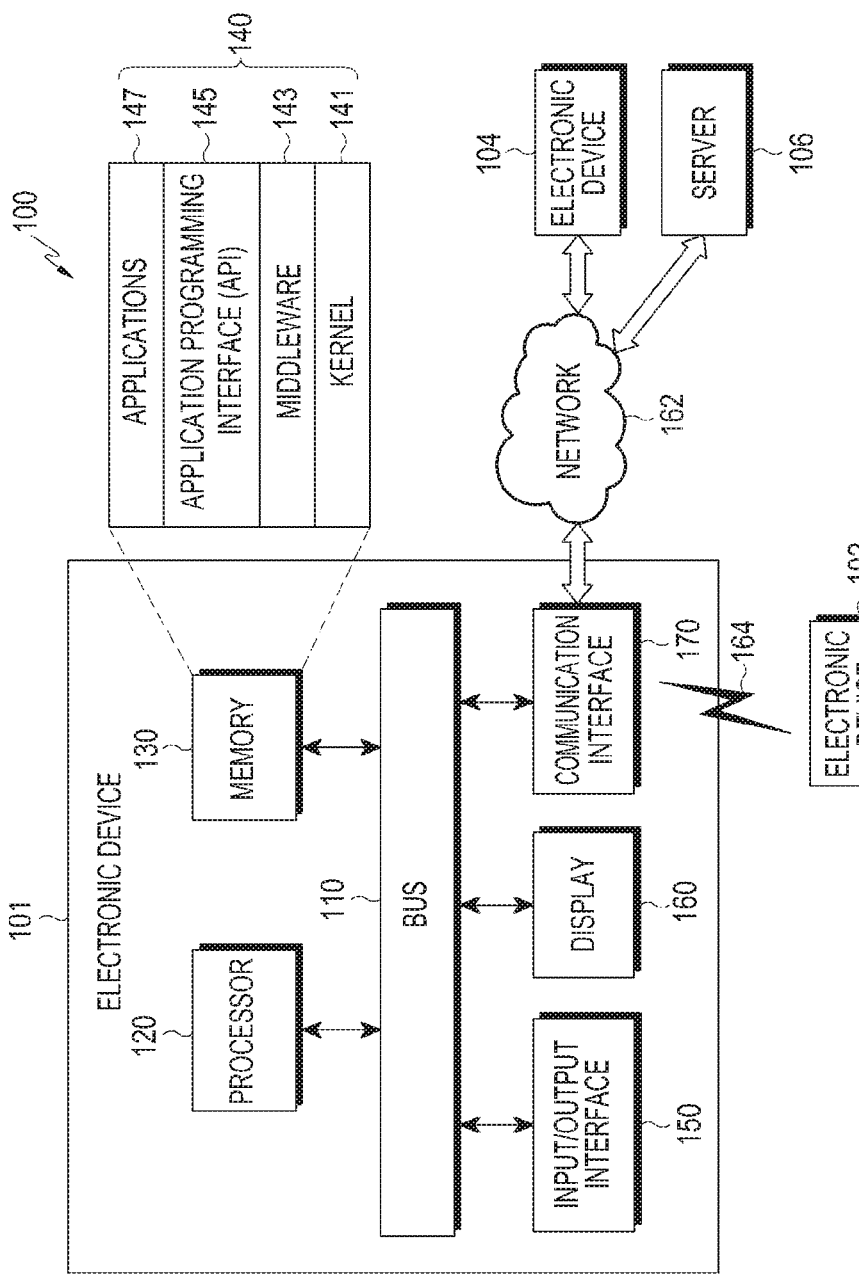
FIG. 1 is a block diagram of a network environment including an electronic device, according to an embodiment of the present disclosure.

Hereinafter, various embodiments of the present disclosure are described with reference to the accompanying drawings. The embodiments and the terminology used herein are not intended to limit the present document to specific embodiments, but are intended to be understood as including various modifications, equivalents, and/or replacements of the corresponding embodiments. In the description of the drawings below, similar reference numerals may be used to designate similar elements. As used herein, singular forms may include plural forms as well unless the context clearly indicates otherwise. In the present disclosure, the expressions "A or B," or "at least one of A and/or B" may include all possible combinations of the items listed. The expressions "a first," "a second," "the first," or "the second" may modify corresponding elements regardless of the order or importance, and is used only to distinguish one element from another element, but do not limit the corresponding elements. When an element (e.g., a first element) is referred to as being "(functionally or communicatively) connected," or "directly coupled" to another element (e.g., a second element), the element may be connected directly to the other element or connected to the other element through yet another element (e.g., a third element).

The expression "configured to" as used in various embodiments of the present disclosure may be interchangeably used with, for example, "suitable for," "having the capacity to," "designed to," "adapted to," "made to," or "capable of" in terms of hardware or software, according to the circumstances. Alternatively, in some situations, the expression "device configured to" may indicate that the device, together with other devices or components, "is able to." For example, the phrase "processor adapted (or configured) to perform A, B, and C" may indicate a dedicated processor (e.g., an embedded processor) only for performing the corresponding operations or a general purpose processor (e.g., a central processing unit (CPU) or an application processor (AP)) that may perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. According to an embodiment of the present disclosure, a wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

The electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) machine, a magnetic resonance imaging (MRI) machine, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, a point of sale (POS) device in a shop, or an IoT device (e.g., a light bulb, various sensors, an electric or gas meter, a sprinkler device, a fire alarm, a thermostat, a streetlamp, a toaster, sporting goods, a hot water tank, a heater, a boiler, etc.). An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned various devices. However, an electronic device according to the present disclosure is not limited to the above described devices. In the present disclosure, the term "user" may indicate a person using an electronic device or a device (e.g. an artificial intelligence electronic device) using an electronic device.

FIG. 1 is a block diagram of a network environment 100 including an electronic device 101, according to an embodiment of the present disclosure.

Referring to FIG. 1, the electronic device 101 may include a bus 110, a processor 120, a memory 130, an input/output interface 150, a display 160, and a communication interface 170. In an embodiment of the present disclosure, the electronic device 101 may omit at least one of the elements, or may further include other elements.

The bus 110 may include a circuit that interconnects the elements 110-170 and transfer communication (for example, a control message or data) between the elements 110-170.

The processor 120 may include one or more of a CPU, an AP, and a communication processor (CP). For example, the processor 120 may execute operations or process data related to control and/or communication of at least one other element of the electronic device 101.

The memory 130 may include a volatile memory and/or a non-volatile memory. The memory 130 may store, for example, instructions or data related to at least one other element of the electronic device 101.

According to an embodiment, the memory 130 may store software and/or a program 140. For example, the program 140 may include a kernel 141, middleware 143, an application programming interface (API) 145, and/or application programs (or "applications") 147. At least some of the kernel 141, the middleware 143, and the API 145 may be referred to as an operating system (OS).

For example, the kernel 141 may control or manage system resources (for example, the bus 110, the processor 120, or the memory 130) which are used to execute an operation or a function implemented in the other programs (for example, the middleware 143, the API 145, or the application programs 147). Furthermore, the kernel 141 may provide an interface through which the middleware 143, the API 145, or the application programs 147 may access the individual elements of the electronic device 101, thereby controlling or managing the system resources.

The middleware 143, for example, may function as an intermediary for allowing the API 145 or the application programs 147 to communicate with the kernel 141 to exchange data. In addition, the middleware 143 may process one or more task requests received from the application programs 147 according to priority thereof. For example, the middleware 143 may assign priorities for using the system resources (for example, the bus 110, the processor 120, the memory 130, or the like) of the electronic device 101, to at least one of the application programs 147 and process the at least one task requests. The API 145 is an interface used, by the applications 147, to control a function provided from the kernel 141 or the middleware 143, and may include, for example, at least one interface or function (e.g., instruction) for file control, window control, image processing, text control, etc. The input/output interface 150, for example, may transfer an instruction or data, which has been input from the user or another external device, to a different element(s) of the electronic device 101 or may output an instruction or data, which has been received from a different element(s) of the electronic device 101, to the user or to another external device.

The display 160 may include, for example, a liquid crystal display (LCD), a light emitting diode (LED) display, an organic LED (OLED) display, a micro electro mechanical system (MEMS) display, or an electronic paper display. The display 160 may display, for example, various types of contents (for example, text, images, videos, icons, or symbols) to the user. The display 160 may include a touch screen and may receive, for example, a touch, gesture, proximity, or hovering input by using an electronic pen or a part of a user's body.

The communication interface 170 may establish communication between, for example, the electronic device 101 and an external device (for example, a first external electronic device 102, a second external electronic device 104, or a server 106). For example, the communication interface 170 may be connected to a network 162 through wireless or wired communication to communicate with the external electronic device 104 or the server 106.

The wireless communication may include, for example, cellular communication including at least one of long term evolution (LTE), LTE advanced (LTE-A), code division multiple access (CDMA), wideband CDMA (WBCDMA), universal mobile telecommunications system (UMTS), wireless broadband (WiBro), and global system for mobile communications (GSM). The wireless communication may include, for example, at least one of wireless fidelity (WiFi), Bluetooth (BT), Bluetooth low energy (BLE), Zigbee, near field communication (NFC), magnetic secure transmission, radio frequency (RF), and body area network (BAN). Wireless communication may include global navigation satellite system (GNSS). The GNSS may be for example, GPS, globalnaya navigazionnaya sputnikovaya sistema (Glonass), Beidou Navigation Satellite System (hereinafter, Beidou), or Galileo, the European global satellite-based navigation system. Hereinafter, in the present document, "GPS" may be used interchangeably with "GNSS." The wired communication may include at least one of, for example, a universal serial bus (USB), a high definition multimedia interface (HDMI), recommended standard 232 (RS-232), and a plain old telephone service (POTS). The network 162 may include a telecommunication network, for example, at least one of a computer network (for example, a local area network (LAN) or a wireless LAN (WLAN)), the Internet, and a telephone network.

Each of the first and second external electronic devices 102 and 104 may be a device which is the same as or different from the electronic device 101.

According to various embodiments, all or some of the operations performed in the electronic device 101 may be performed in another electronic device or a plurality of electronic devices (e.g., the electronic devices 102 and 104 or the server 106).

According to an embodiment, when the electronic device 101 must perform a function or service automatically or in response to a request, the electronic device 101 may request the electronic device 102 or 104, or the server to perform at least some functions relating thereto, instead of autonomously or additionally performing the function or service. The electronic device 102 or 104, or the server 106 may execute the requested functions or the additional functions, and may deliver a result of the execution to the electronic device 101. The electronic device 101 may process the received result as is or additionally to provide the requested functions or services. Cloud computing, distributed computing, or client-server computing technology may be used.

Figure 2:
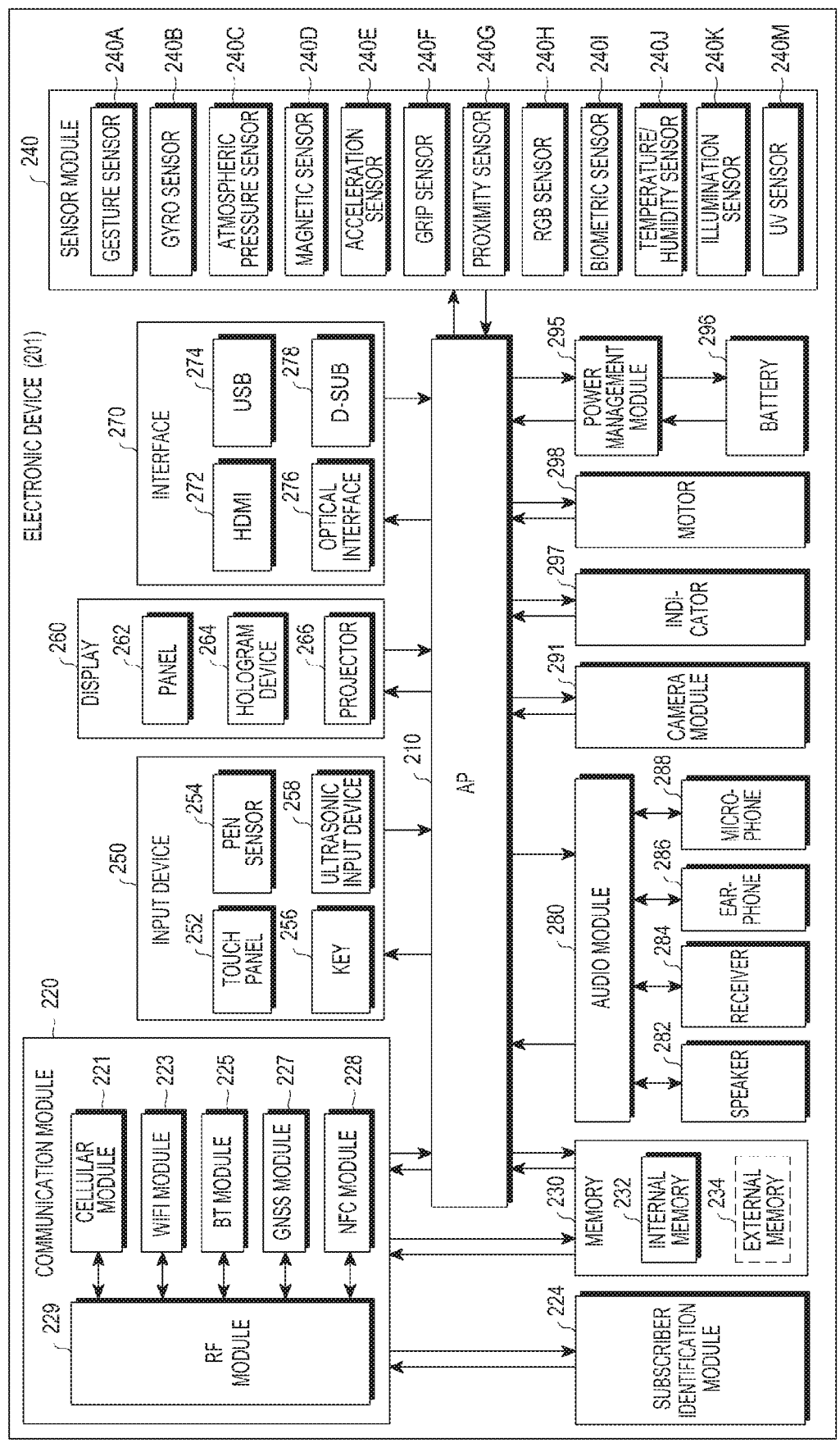
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include, for example, the whole or part of the electronic device 101 illustrated in FIG. 1. The electronic device 201 may include at least one AP 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The AP 210 may control a plurality of hardware or software components connected to the AP 210 by driving an OS or an application program and perform processing of various pieces of data and calculations. The AP 210 may be implemented by, for example, a system on chip (SoC).

According to an embodiment of the present disclosure, the AP 210 may further include a graphics processing unit (GPU) and/or an image signal processor (ISP). The AP 210 may include at least some (for example, a cellular module 221) of the elements illustrated in FIG. 2. The AP 210 may load an instruction or data, which has been received from at least one of the other elements (for example, a non-volatile memory), process the same, and store the result data in the non-volatile memory.

According to an embodiment of the present disclosure, the AP 210 may collect a user's state information (for example, health information, position information, situation information, etc.).

According to an embodiment of the present disclosure, the AP 210 may collect user state information including health information, which indicates a user's state of health, position information, which indicates the user's position, situation information, which indicates the user's situation, etc. For example, the AP 210 may receive a user's health examination information from a service provider or collect the user's health information, which has been measured through the sensor module 240.

According to an embodiment of the present disclosure, the AP 210 may determine at least one piece of SAR characteristic information, which is related to a SAR, based on collected state information and may confirm communication power information, which corresponds to the determined SAR characteristic information.

According to an embodiment of the present disclosure, the AP 210 may analyze collected user state information, determine a characteristic value, which depends on at least one piece of SAR characteristic information related to a SAR, and confirm a SAR type, which corresponds to the determined characteristic value. For example, SAR characteristic information may include, in the case of health information, at least one (or some) of body mass, bone density, blood lead level, etc.; in the case of position information, SAR characteristic information may include at least one (or some) of a nation, a region, a place, etc.; and, in the case of situation information, SAR characteristic information may include at least one (or some) of age, gender, schedule, group information, etc. The SAR characteristic value may include, in the case of health information, at least one (or some) of the body mass index (or value), the bone density value, the blood lead level value, etc.; in the case of position information, may include at least one (or some) of the name of a nation (for example, Korea, USA, Japan), the name of a region (for example, Seoul, Busan, Jongno-gu, Jung-gu, Oregon, Los Angeles (LA), New York, Tokyo, Osaka etc.), the name of a place (for example, school, home, a company), etc.; and, in the case of situation information, may include at least one (or some) of age, gender, schedule (for example, pregnancy, prenatal education, child care), group member's health information, position information, situation information, etc. The AP 210 may store SAR characteristic-wise level setting information, which has levels set so as to correspond to a plurality of threshold characteristic value ranges with regard to each of at least one SAR characteristic, and SAR type-wise communication power setting information, which has SAR type-wise communication power information set so as to correspond to at least one threshold calculation result range, in the memory 230.

The AP 210 may confirm level information, which corresponds to at least one SAR characteristic value, based on SAR characteristic-wise level setting information stored in the memory 230, calculate the confirmed level information, and output the calculation result. For example, the AP 210 may assign a weight to each level value, which corresponds to at least one SAR characteristic value, and calculate the average value thereof.

According to an embodiment of the present disclosure, the AP 210 may confirm a SAR type according to the calculation result, based on SAR type-wise communication power setting information, and may confirm communication power information, which corresponds to the confirmed SAR type.

According to an embodiment of the present disclosure, the AP 210 may adjust the communication power based on the confirmed communication power information.

According to an embodiment of the present disclosure, the AP 210 may receive device information from a plurality of wearable devices, collect device information regarding an electronic device 201, determine SAR characteristic information, which is related to a SAR, based on the device information regarding the plurality of wearable devices and the device information regarding the electronic device 201, confirm communication power information based on the determined SAR characteristic information, and adjust the communication power of the plurality of wearable devices and the communication power of the electronic device 201 based on the confirmed communication power information.

According to an embodiment of the present disclosure, the AP 210 may receive device information from a plurality of external devices, collect device information regarding an electronic device 201, determine radiation characteristic information, which is related to radiation, based on the device information regarding the plurality of external devices and the device information regarding the electronic device 201, confirm communication schedule information based on the determined radiation characteristic information, and adjust the communication schedule of the plurality of external devices and the communication schedule of the electronic device 201 based on the confirmed communication schedule information.

A feature identical or similar to the communication module 220 (for example, a communication interface 170) may be provided. The communication module 220 may include, for example, a cellular module 221, a WiFi module 223, a BT module 225, a GNSS module 227, a NFC module 228, and a RF module 229. The cellular module 221 may provide a voice call, a video call, a text message service, or an Internet service through, for example, a communication network. According to an embodiment of the present disclosure, the cellular module 221 may identify and authenticate the electronic device 201 within a communication network using the SIM card 224. The cellular module 221 may perform at least some of the functions that the AP 210 may provide. The cellular module 221 may include a CP. At least some (two or more) of the cellular module 221, the WiFi module 223, the BT module 225, the GNSS module 227, and the NFC module 228 may be included in a single integrated circuit (IC) or IC package. The RF module 229 may transmit/receive, for example, a communication signal (for example, an RF signal). The RF module 229 may include, for example, a transceiver, a power amplifier module (PAM), a frequency filter, a low noise amplifier (LNA), or an antenna. At least one of the cellular module 221, the WiFi module 223, the BT module 225, the GNSS module 227, and the NFC module 228 may transmit/receive an RF signal through a separate RF module. The SIM 224 may include, for example, unique identification information (for example, integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may include, for example, at least one of a volatile memory (for example, a dynamic random access memory (DRAM), a static RAM (SRAM), or a synchronous DRAM (SDRAM)), a non-volatile memory (for example, a one time programmable read only memory (OTROM)), a programmable ROM (PROM), an erasable PROM (EPROM), an electrically erasable PROM (EEPROM), a mask ROM, a flash ROM, a flash memory, a hard drive, or a solid state drive (SSD)). The external memory 234 may include a flash drive, for example, a compact flash (CF) drive, a secure digital (SD) drive, a micro-SD drive, a mini-SD drive, an extreme digital (xD) drive, a multi-media card (MMC), or a memory stick. The external memory 234 may be functionally or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor.

The sensor module 240 may further include a control circuit for controlling one or more sensors included therein. The electronic device 201 may further include a processor, which is configured to control the sensor module 240, as a part of the AP 210 or separately from the AP 210, thereby controlling the sensor module 240 while the AP 210 is in a reduced power (e.g. sleep) state.

The input device 250 may include, for example, a touch panel 252, a (digital) pen sensor 254, a key 256, or an ultrasonic input device 258. The touch panel 252 may use at least one of, for example, a capacitive type panel, a resistive type panel, an infrared type panel, and an ultrasonic type panel. Also, the touch panel 252 may further include a control circuit. The touch panel 252 may further include a tactile layer and provide a tactile reaction to a user. The (digital) pen sensor 254 may be a part of the touch panel 252, for example, or may include a separate sheet for recognition. The key 256 may include, for example, a physical button, an optical key or a keypad. The ultrasonic input device 258 may detect ultrasonic waves generated by an input tool through a microphone 288) and identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262 may include the touch panel 252 and at least one module. The panel 262 may include a pressure sensor (or a force sensor) capable of measuring an intensity of pressure with regard to a user's touch. The pressure sensor may be implemented integrally with the touch panel 252, or may be implemented as at least one sensor that is separate from the touch panel 252. The hologram 264 may show a three dimensional image in the air by using an interference of light. The projector 266 may display an image by projecting light onto a screen. The screen may be located, for example, internal or external to the electronic device 201. The interface 270 may include, for example, an HDMI 272, a USB 274, an optical interface 276, or a D-subminiature (D-sub) connector 278. The interface 270 may be included in, for example, the communication interface 170 illustrated in FIG. 1. Additionally or alternatively, the interface 270 may, for example, include a mobile high-definition link (MHL) interface, an SD card/MMC interface, or an Infrared Data Association (IrDA) standard interface.

The audio module 280 may convert, for example, sound and electrical signals bidirectionally. At least some elements of the audio module 280 may be included in, for example, the input/output interface 145 illustrated in FIG. 1. The audio module 280 may process sound information which is input or output through, for example, a speaker 282, a receiver 284, an earphone 286, the microphone 288 or the like. The camera module 291 is, for example, a device that may take still and moving images and, according to an embodiment of the present disclosure, may include one or more image sensors (e.g., a front sensor or a back sensor), a lens, an ISP or a flash (e.g., LED or xenon lamp).

The power management module 295 may manage, for example, power of the electronic device 201. According to an embodiment, the power management module 295 may include a power management integrated circuit (PMIC), a charger IC, and a battery gauge. The PMIC may use a wired and/or wireless charging method. Examples of the wireless charging method may include, for example, a magnetic resonance method, a magnetic induction method, an electromagnetic method, and the like; and additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery and/or a solar battery.

According to an embodiment of the present disclosure, the power management module 295 may adjust communication power based on confirmed communication power information. The communication power information may include an amount of transmission power, which is used to radiate transmission signals, or may include an amount of transmission power and an amount of reception power, which is used to receive reception signals. For example, the power management module 295 may change a current amount of transmission power to a confirmed amount of transmission power.

The indicator 297 may display a certain state (for example, a booting state, a message state, a charging state, or the like) of the electronic device 201 or a part (for example, the AP 210) of the electronic device 201. The motor 298 may convert an electrical signal into a mechanical vibration and may generate a vibration, haptic effects, or the like. The electronic device 201 may include, for example, a mobile TV support device (for example, a GPU) that can process media data that follows a specification, such as digital multimedia broadcasting (DMB), digital video broadcasting (DVB), or mediaFlo™. Each of the above-described component elements of hardware according to the present disclosure may be configured with one or more components, and the names of the corresponding component elements may vary based on the type of electronic device. According to an embodiment of the present disclosure, the electronic device (e.g., the electronic device 201) may not include some elements or may further include additional elements. Some of elements may be coupled to constitute one object, where the electronic device may perform the same functions as those which the corresponding elements performed before being coupled to each other.

Figure 3:
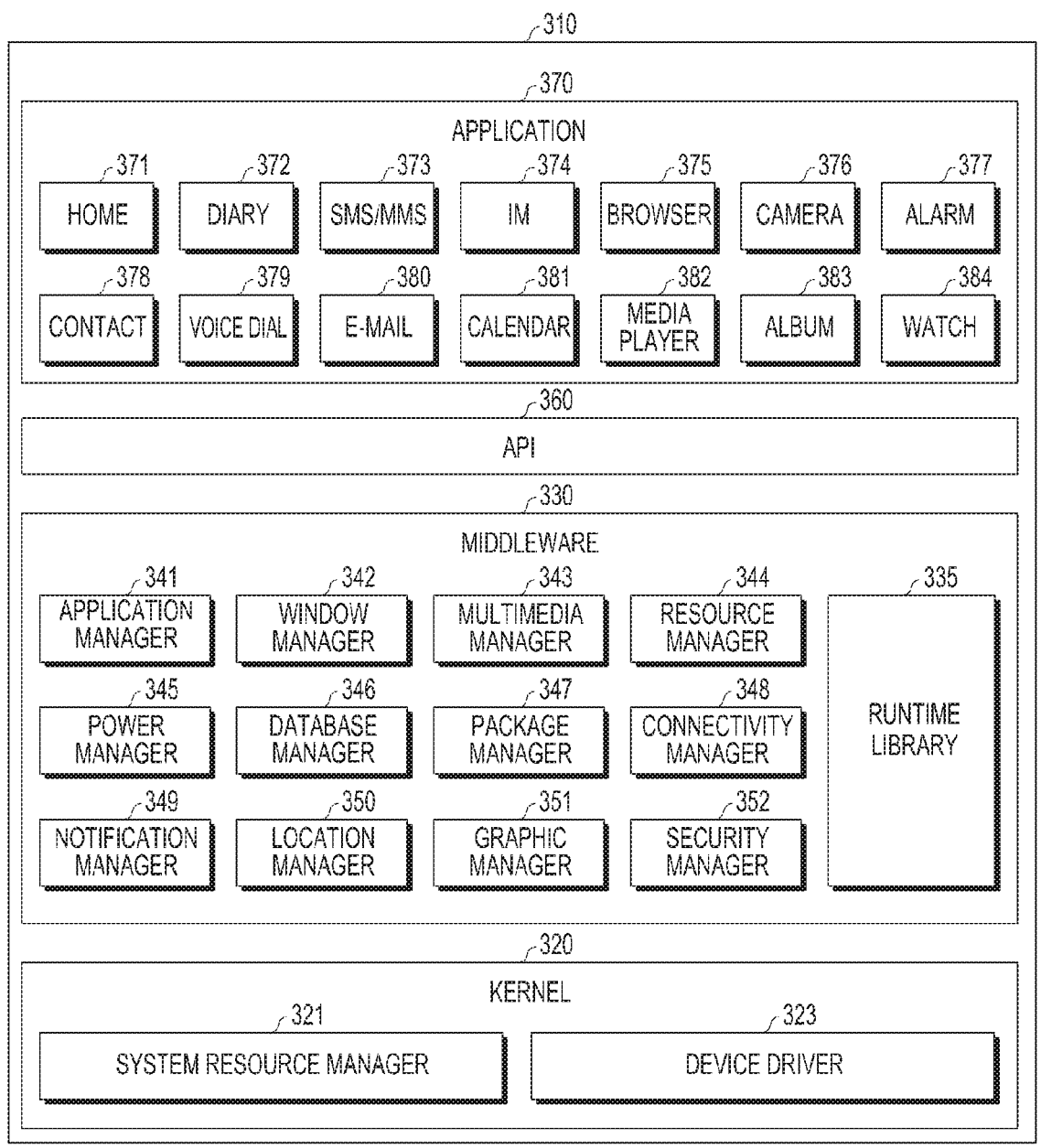
FIG. 3 is a block diagram of a programming module according to an embodiment of the present disclosure.

FIG. 3 is a block diagram of a program module according to an embodiment of the present disclosure.

According to an embodiment, the program module 310 (for example, program 140) may include an OS that controls various resources related to an electronic device (for example, electronic device 101) and/or various applications (for example, application programs 147) that are driven on the OS. The OS may include, for example, Android®, iOS®, Windows®, Symbian™, Tizen®, or Bada™.

Referring to FIG. 3, the program module 310 may include a kernel 320 (for example, the kernel 141), middleware 330 (for example, the middleware 143), an API 360 (for example, the API 145), and/or an application 370 (for example, application programs 147). At least a part of the program module 310 may be preloaded on the electronic device, or may be downloaded from an external electronic device (for example, the electronic device 102 or 104, or the server 106).

The kernel 320 may include, for example, a system resource manager 321 and/or a device driver 323. The system resource manager 321 may perform control, allocation, retrieval, or the like of system resources. According to an embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may provide a function required by the application 370 in common or may provide various functions to the application 370 through the API 360 so that the application 370 may efficiently use limited system resources within the electronic device. The middleware 330 may include at least one of a runtime library 335, an application manger 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which a compiler uses in order to add a new function through a programming language while the application 370 is being executed. The runtime library 335 may perform input/output management, memory management, or arithmetic function processing. The application manager 341 may manage the life cycle of the application 370, for example. The window manager 342 may manage graphical user interface (GUI) resources used by the screen. The multimedia manager 343 may grasp formats needed for playback of multimedia files and may perform encoding or decoding of multimedia files using a codec that is suitable for the corresponding format. The resource manager 344 may manage source code of the application 370 or a space of the memory. The power manager 345 may manage the capacity or power of the battery, for example, and may provide power information that is needed for operation of the electronic device. The power manager 345 may operate with a basic input/output system (BIOS). The database manager 346 may generate, search, or change a database, which is to be used by the application 370, for example. The package manager 347 may manage the installation or update of an application distributed in the form of a package file.

The connectivity manager 348 may manage a wireless connection, for example. The notification manager 349 may, for example, provide a user with events, such as an incoming message, an appointment, and a proximity notification. The location manager 350 may manage the electronic device's position information, for example. The graphic manager 351 may manage, for example, a graphic effect, which is to be provided to a user, or a user interface related to the graphic effect. The security manager 352 may provide, for example, system security or user authentication. According to an embodiment of the present disclosure, the middleware 330 may include a telephony manager for managing a voice or video telephony function of the electronic device or a middleware module capable of forming a combination of the elements described above. The middleware 330 may provide a module that is customized for each operation system type. The middleware 330 may dynamically eliminate a part of existing components or add a new component. The API 360 is, for example, a set of API programming functions, and may be provided in a different configuration based on an OS. For example, in the case of Android® or iOS®, one API set may be provided to each platform, and in the case of Tizen®, two or more API sets may be provided to each platform.

The application 370 may include, for example, a home application 371, a dialer application 372, a short message service/multimedia messaging service (SMS/MMS) application 373, an instant message (IM) application 374, a browser application 375, a camera application 376, an alarm application 377, a contact application 378, a voice dial application 379, an email application 380, a calendar application 381, a media player application 382, an album application 383, a watch application 384, and an application that provides health care (for example, measurement of an amount of exercise or a level of blood glucose) or environmental information (for example, atmospheric pressure, humidity, or temperature information). According to an embodiment of the present disclosure, the application 370 may include an information exchange application that can support information exchange between the electronic device and an external electronic device. The information exchange information may include, for example, a notification relay application for transferring certain information to an external electronic device or a device management application for managing an external electronic device. For example, the notification relay application may transfer notification information, which has been generated by a different application of the electronic device, to an external electronic device or may receive notification information from an external electronic device and provide the user with the same. The device management application may turn on/off the function of an external electronic device (for example, the external electronic device itself (or some elements thereof) that communicates with the electronic device, adjust the brightness (or resolution) of the display, or install, delete, or update an application that is run by the external electronic device. The application 370 may include an application that has been designated according to an attribute of an external electronic device (for example, a health management application for a mobile medical device). The application 370 may include an application received from an external electronic device. At least a part of the program module 310 may be driven (for example, executed) as software, firmware, hardware (for example, AP 210), or a combination of at least two thereof, and may include a module for executing at least one function, a program, a routine, an instruction set, or a process.

Figure 4:
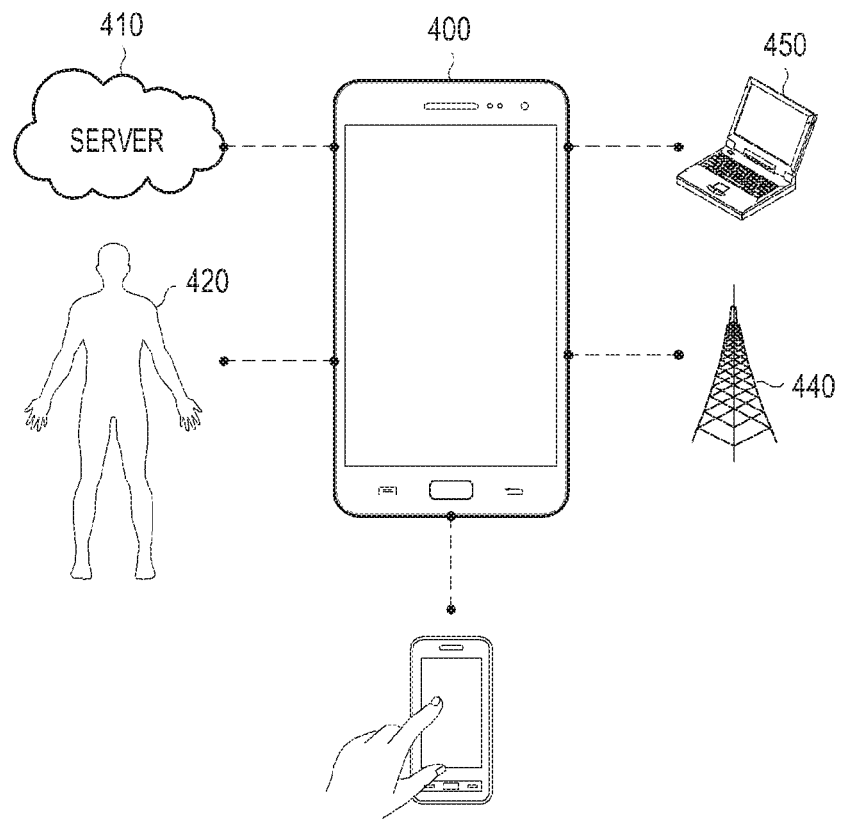
FIG. 4 is a diagram illustrating a method of adjusting communication power based on user state information by an electronic device according to an embodiment of the present disclosure.

FIG. 4 is a diagram illustrating a method of adjusting communication power based on user state information by an electronic device according to an embodiment of the present disclosure.

Referring to FIG. 4, the electronic device 400 may collect user state information, which includes a user's health information, position information, situation information, etc., determine SAR characteristic information, which is related to a SAR, based on collected user state information, confirm communication power information, which corresponds to the determined SAR characteristic information, and adjust communication power based on confirmed communication power information.

According to an embodiment of the present disclosure, the electronic device 400 may receive user state information from a server 410, which provides a user's health examination information.

According to an embodiment of the present disclosure, the electronic device 400 may request the server 410, which provides the user's health examination information, to provide health examination information, in order to collect user state information, and receive the requested health examination information from the server 410.

According to an embodiment of the present disclosure, the electronic device 400 may receive health information (for example, information including at least one (or some) of body mass, bone density, blood lead level, etc.), which has been measured by at least one sensor 420 that is attached to a user's body.

According to an embodiment of the present disclosure, the electronic device 400 may receive a user's input (for example, at least one (or some) of a key input, a touch input, a gesture input, etc.) with regard to the user's health information, position information, and situation information.

According to an embodiment of the present disclosure, the electronic device 400 may receive a user's position information, such as information regarding a cell of the electronic device 400, from the communication network 440.

According to an embodiment of the present disclosure, the electronic device 400 may request an external electronic device 450, which stores health information, position information, and situation information regarding group members inside a group (for example, at least one (or some) of a family, friends, a company, a region, a nation, etc.), to provide health information, position information, and situation information regarding the group members and may receive the health information, position information, and situation information regarding the group members from the external electronic device 450. Such health information regarding the group members may be variously generated according to the nation (or group)-wise environment (for example, at least one (some) of eating habits, natural environments, etc.).

Figure 5:
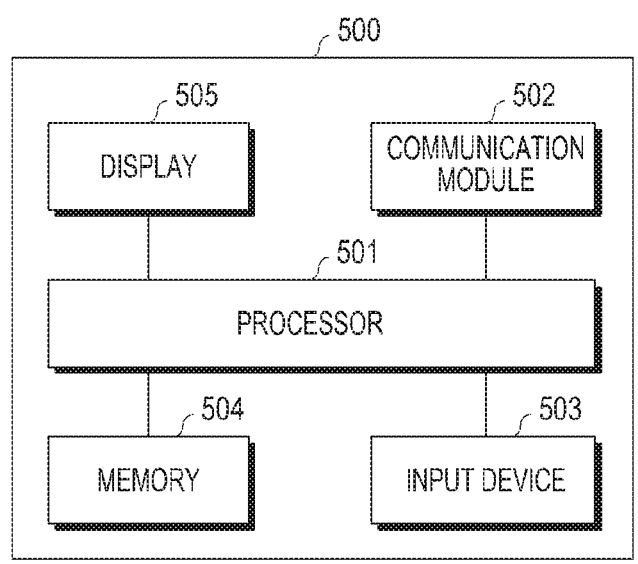
FIG. 5 is a block diagram of an electronic device for adjusting communication power based on user state information according to an embodiment of the present disclosure.

FIG. 5 is a block diagram of an electronic device for adjusting communication power based on user state information according to an embodiment of the present disclosure.

Referring to FIG. 5, the electronic device 500 may include a processor 501, a communication module 502, an input device 503, a memory 504, and a display 505.

According to an embodiment of the present disclosure, the processor 501 may collect user state information, which indicates a user's state of health, position, and situation, determine SAR characteristic information from the collected user state information, confirm communication power information, which corresponds to the determined SAR characteristic information, and adjust communication power based on confirmed communication power information.

According to an embodiment of the present disclosure, the processor 501 may determine SAR characteristic information from health examination information, which has been received from a server 510 that provides a user's health examination information, from health information, which has been collected through a health care application that manages the user's health information in real time, or from health information, which has been measured from a sensor that is attached to the user's body. For example, the SAR characteristic information may include at least one (or some) of body mass, bone density, blood lead level, etc.

According to an embodiment of the present disclosure, the processor 501 may determine SAR characteristic information from position information, which has been measured by a position sensor, or from position information, which has been received from a communication network. For example, the SAR characteristic information may include at least one (or some) of a nation, a region, a place, etc.

According to an embodiment of the present disclosure, the processor 501 may determine SAR characteristic information from situation information, which includes information regarding a user's age, gender, schedule, and group members, input through an input device, from schedule information, which has been registered through a schedule application, or from health information, position information, and situation information regarding the group members, which have been received from the external electronic device 550. For example, the SAR characteristic information may include at least one (or some) of an age, a gender, a schedule, a group member's age, a gender, a body mass, a bone density, a blood lead level, a position, a schedule, etc.

According to an embodiment of the present disclosure, the processor 501 may confirm a level value, which corresponds to a characteristic value of SAR characteristic information determined based on SAR characteristic-wise level setting information stored in the memory 504, calculate the confirmed level value through a calculation algorithm, and output the calculation result.

For example, if a body mass index corresponding to SAR characteristic information is 17 kg/m$^2$, a bone density is 200 mg/cm$^2$, and a blood lead level is 40 µg/dl, the processor 501 may confirm, from SAR characteristic-wise level setting information, a first level value, which corresponds to the body mass index 17 kg/m$^2$, a second level value, which corresponds to the bone density 200 mg/cm$^2$, and a third level value, which corresponds to the blood lead level 40 µg/dl and may obtain calculation results regarding the first, second, and third level values through a calculation algorithm.

For example, if a nation corresponding to the SAR characteristic information is Korea, the region is Seoul, and the place is home, the processor 501 may confirm, from SAR characteristic-wise level setting information, a fourth level value, which corresponds to the nation Korea, a fifth level value, which corresponds to the region Seoul, and a sixth level value, which corresponds to the place home, and obtain calculation result values regarding the fourth, fifth, and sixth level values through a calculation algorithm.

For example, if a user's age corresponding to the SAR characteristic information is 35 years, the gender is female, and the schedule is pregnant, the processor 501 may confirm, from SAR characteristic-wise level setting information, a seventh level value, which corresponds to the age 35 years, an eighth level value, which corresponds to the gender female, and a ninth level value, which corresponds to the schedule pregnant and may obtain calculation result values regarding the seventh, eighth, and ninth level values.

According to an embodiment of the present disclosure, the processor 501 may confirm a SAR type, which corresponds to a calculation result value, based on SAR type-wise communication power setting information stored in the memory 504, and may confirm communication power information, which corresponds to the confirmed SAR type.

The SAR type-wise communication power setting information may be distinguished with regard to grades, such as first to n$^{th}$ grades, according to a threshold calculation range. The numeral n may be a natural number.

For example, communication power information of the first grade may include a setting value for minimizing communication power while maintaining communication quality, and communication power information of the n$^{th}$ grade may include a setting value for maximizing communication quality.

According to an embodiment of the present disclosure, the SAR type-wise communication power setting information may be used to distinguish the SAR type with regard to at least one level (for example, first, second, third, . . . , and n$^{th}$ levels), which follow at least one grade (for example, first, second, third, . . . , and n$^{th}$ grades), according to the threshold calculation range. The numeral n may be a natural number.

For example, communication power information of the first level, which follows the first grade, may include a setting value for minimizing communication power while maintaining communication quality, and communication power information of the $n^{th}$ grade, which follows the $n^{th}$ grade, may include a setting value for maximizing communication quality.

According to an embodiment of the present disclosure, the processor 501 may adjust the communication power based on confirmed communication power value. For example, the processor 501 may change a current amount of transmission power or reception power of the communication module 502 to a confirmed amount of transmission power or reception power. The communication module 502 may be a wireless communication circuit.

According to an embodiment of the present disclosure, the processor 501 may receive device information from at least one wearable device, collect device information regarding an electronic device 500, determine SAR characteristic information, which is related to a SAR, based on device information regarding the at least one wearable device and the device information regarding the electronic device 500, confirm communication power information based on determined SAR characteristic information, and adjust the communication power of the at least one wearable device and the communication power of the electronic device 500 based on confirmed communication power information. Certain embodiments in this regard may be implemented as illustrated in FIG. 16 to FIG. 24 described below.

According to an embodiment of the present disclosure, the processor 501 may receive device information from at least one external device, collect device information regarding an electronic device 500, determine radiation characteristic information, which is related to radiation, based on device information regarding the at least one external device and the device information regarding the electronic device 500, confirm communication schedule information based on determined radiation characteristic information, and adjust the communication schedule of the at least one external device and the communication power of the electronic device 500 based on confirmed communication schedule information. Certain embodiments in this regard may be implemented as illustrated in FIG. 25 to FIG. 35A and FIG. 35B described below.

The communication module 502 may perform transmission/reception of data (or signals etc.). According to an embodiment of the present disclosure, the communication module 502 may receive a user's health examination information from the server 410 or may receive the user's health information, position information, situation information, etc. or state information regarding group members (or nation members) from an external electronic device. In addition, the communication module 502 may perform transmission/reception of data (or signals etc.) based on a changed amount of transmission power or reception power.

The input device 503 may receive user inputs regarding a user's health information, position information, situation information, etc.

The memory 504 may store information, which is used by the electronic device 500 to adjust communication power according to user state information. For example, the memory 504 may store SAR characteristic-wise level setting information, which has levels set so as to correspond to at least one threshold characteristic value range with regard to each of at least one SAR characteristic, and SAR type-wise communication power setting information, which has SAR type-wise communication power information set so as to correspond to at least one threshold calculation result range.

According to an embodiment of the present disclosure, the SAR characteristic-wise level setting information and the SAR type-wise communication power information may be stored in the server 410, not in the memory 504, and may be transferred to the electronic device 500 at the request of the electronic device 500.

The display 504 may display a user interface for receiving user inputs regarding the user's health information, position information, and situation information.

Figure 6:
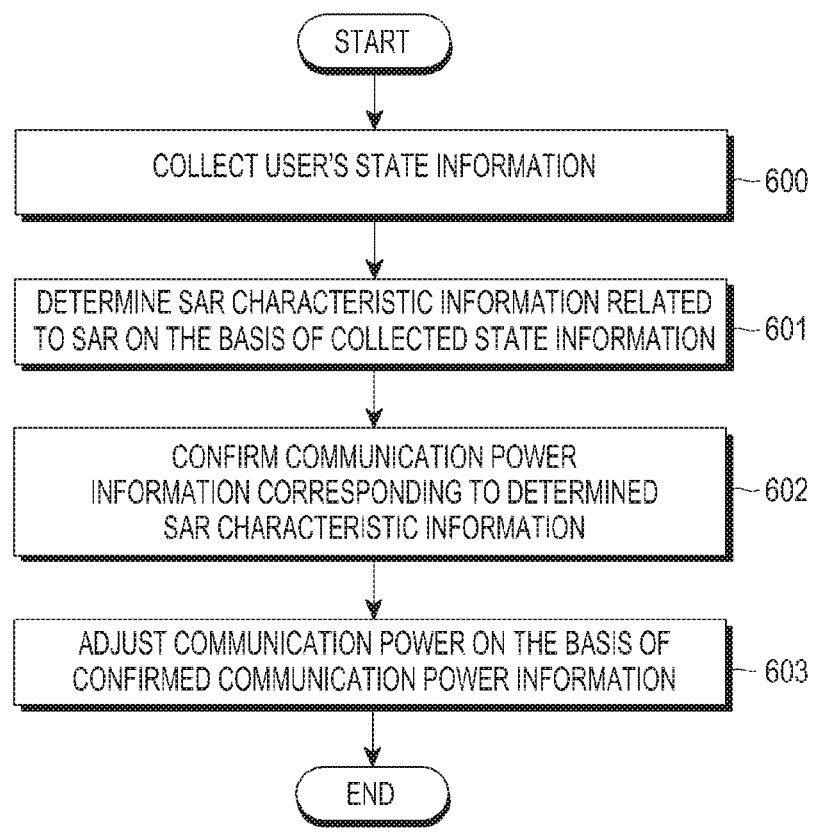
FIG. 6 is a flowchart of a method of adjusting communication power based on user state information by an electronic device according to an embodiment of the present disclosure.

FIG. 6 is a flowchart of a method of adjusting communication power based on user state information by an electronic device according to an embodiment of the present disclosure. Step 600 to 603 may be performed through one of an electronic device 101, 104, 201, 400, or 500, a server 106 or 410, a processor 120, 210, 401, or 501, and a program module 310.

Referring to FIG. 6, in step 600, the electronic device 500 may collect a user's state information. For example, the electronic device 500 may collect the user's health information, position information, and situation information. The health information may be collected through a sensor, which is included in the electronic device 500, an application, which collects the user's health information, sensors, which are attached to the user's body, a server 410, which provides the user's health examination information, or the like. The position information may be collected through a position sensor, which is included in the electronic device 500, a communication network, which provides the user's position information, an external electronic device, which provides position information, or the like. The situation information may be collected through a user input, which has been input by the input device 503 of the electronic device 500, a schedule application, an external electronic device, which provides group information, or the like.

In step 601, the electronic device 500 may determine SAR characteristic information, which is related to a SAR, based on the collected state information. For example, the electronic device 500 may determine at least one (or some) of an age, a gender, a position, a body mass, a bone density, a blood lead level, a schedule, a group member's age, gender, body mass, bone density, blood lead level, position, schedule, etc., based on the collected state information.

In step 602, the electronic device 500 may confirm communication power information that corresponds to the determined characteristic information. For example, the electronic device 500 may confirm level information, which corresponds to at least one SAR characteristic value, based on SAR characteristic-wise level setting information in the memory 504, calculate the confirmed level information, output the calculation result, determine a SAR type, according to the calculation result, based on the SAR type-wise communication power setting information, and confirm communication power information that corresponds to the determined SAR type.

In step 603, the electronic device 500 may adjust the communication power based on the confirmed communication power information. For example, the electronic device 500 may change a current amount of transmission power or reception power of the communication module 502 to a confirmed amount of transmission power or reception power.

Figure 7:
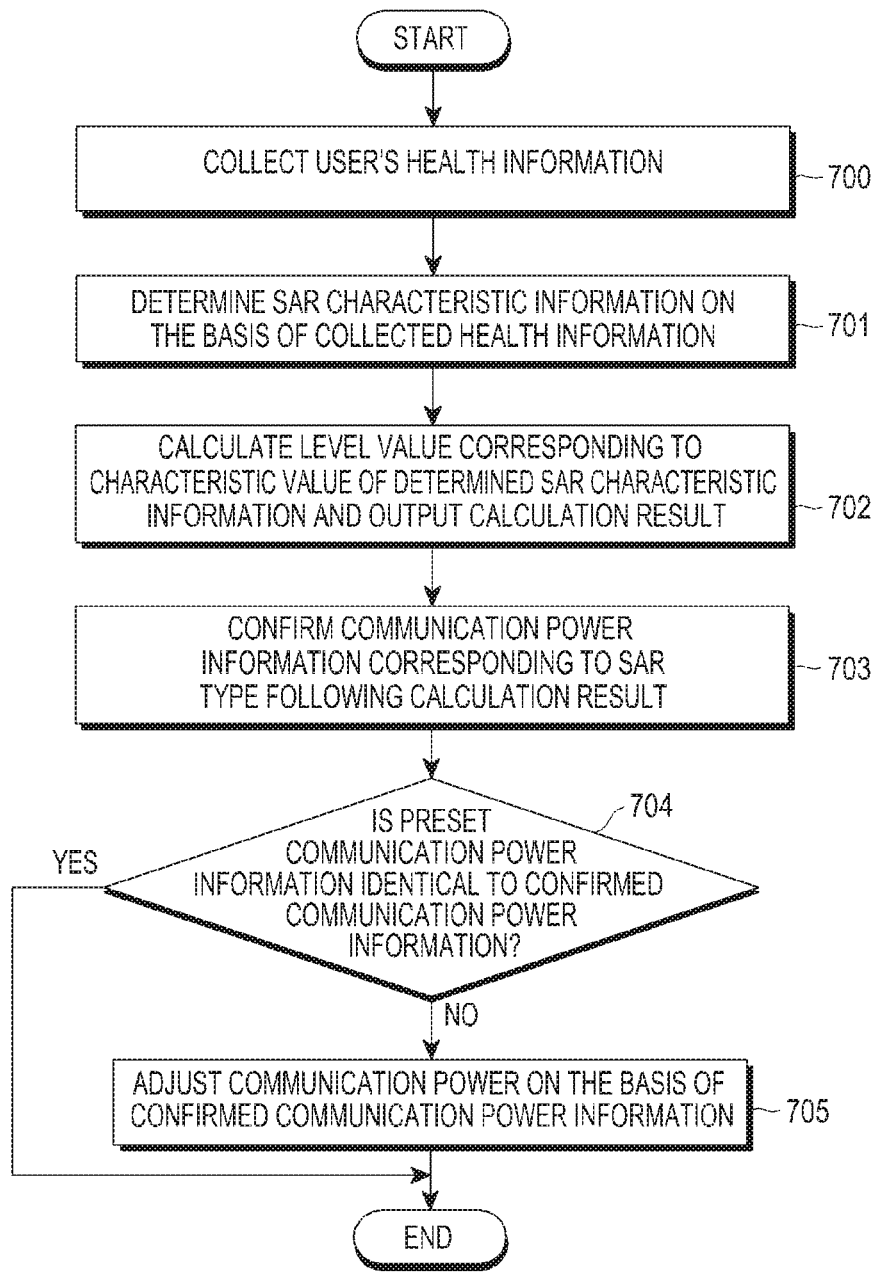
FIG. 7 is a flowchart of a method of adjusting communication power based on user health information by an electronic device according to an embodiment of the present disclosure.

FIG. 7 is a flowchart of a method of adjusting communication power based on user health information by an electronic device according to an embodiment of the present disclosure. Steps 700 to 705 may be performed through one of an electronic device 101, 104, 201, 400, or 500, a server 106 or 410, a processor 120, 210, 401, or 501, and a program module 310.

Referring to FIG. 7, in step 700, the electronic device 500 may collect a user's heath information.

According to an embodiment of the present disclosure, the electronic device 500 may collect the user's health information through a health care application, which measures and manages the user's health information. For example, the electronic device 400 may be provided with measurement values with regard to respective health analysis items, such as blood glucose level, pulse, blood pressure, body fat, weight, body mass index, bone density, blood lead level, etc., through the health care application.

According to an embodiment of the present disclosure, the electronic device 500 may request the server 410, which provides the user's health examination information, to provide health examination information and may receive at least a part of the health examination information from the server 410. The health examination information may include average health information not only regarding individuals, but also members who constitute a group or a nation, to which individuals belong. In connection with such health examination information, group-wise or nation-wise average health information may be variously generated according to the group-wise or nation-wise environments (for example, at least one (or some) of eating habits, natural environments, etc.).

In step 701, the electronic device 500 may determine SAR characteristic information based on the collected health information.

According to an embodiment of the present disclosure, the electronic device 500 may determine SAR characteristic information (for example, information including at least one (or some) of body mass index, bone density, and blood lead level) from health information (for example, information including at least one (or some) of blood glucose level, pulse, blood pressure, body fat, weight, body mass index, bone density, and blood lead level) provided by a health care application.

According to an embodiment of the present disclosure, the electronic device 500 may determine SAR characteristic information (for example, information including at least one (or some) of body mass index, bone density, and blood lead level) from health examination information (for example, information including at least one (or some) of heavy metals in the blood, hydrocarbon in urine, and suspected disruptors in urine) received from the server 410.

In step 702, the electronic device 500 may calculate a level value, which corresponds to a characteristic value of the determined SAR characteristic information, and output the calculation result.

According to an embodiment of the present disclosure, the electronic device 500 may confirm, from SAR characteristic-wise level setting information stored in the memory 504, level values corresponding to a measurement value regarding body mass index, a measurement value regarding bone density, and a measurement value regarding blood lead level, respectively, calculate the confirmed level values, and output the calculation result values. For example, the electronic device 500 may calculate level values using a similarity algorithm and may output the calculation result values.

In step 703, the electronic device 500 may confirm communication power information that corresponds to the SAR type that follows the calculation result.

According to an embodiment of the present disclosure, the processor 500 may confirm a SAR type, which corresponds to a calculation result value, based on a SAR type-wise communication power setting information stored in the memory 504, and confirm the amount of communication power, which corresponds to the confirmed SAR type.

In step 704, the electronic device 500 may determine whether preset communication power information and the confirmed communication power information are identical or not and may end the operation, when the preset communication power information and the confirmed communication power information are identical, or perform step 705, when the preset communication power information and the confirmed communication power information are not identical.

According to an embodiment of the present disclosure, the electronic device 500 may determine whether a preset amount of communication power and the confirmed amount of communication power are identical or not and may perform data transmission/reception based on the preset amount of communication power, when the preset amount of communication power and the confirmed amount of communication power are identical.

In step 705, the electronic device 500 may adjust the communication power based on the confirmed communication power information.

According to an embodiment of the present disclosure, the electronic device 500 may change the preset amount of communication power to the confirmed amount of communication power, when the present amount of communication power and the confirmed amount of communication power are not identical, and may perform data transmission/reception based on the changed amount of communication power.

Figure 8:
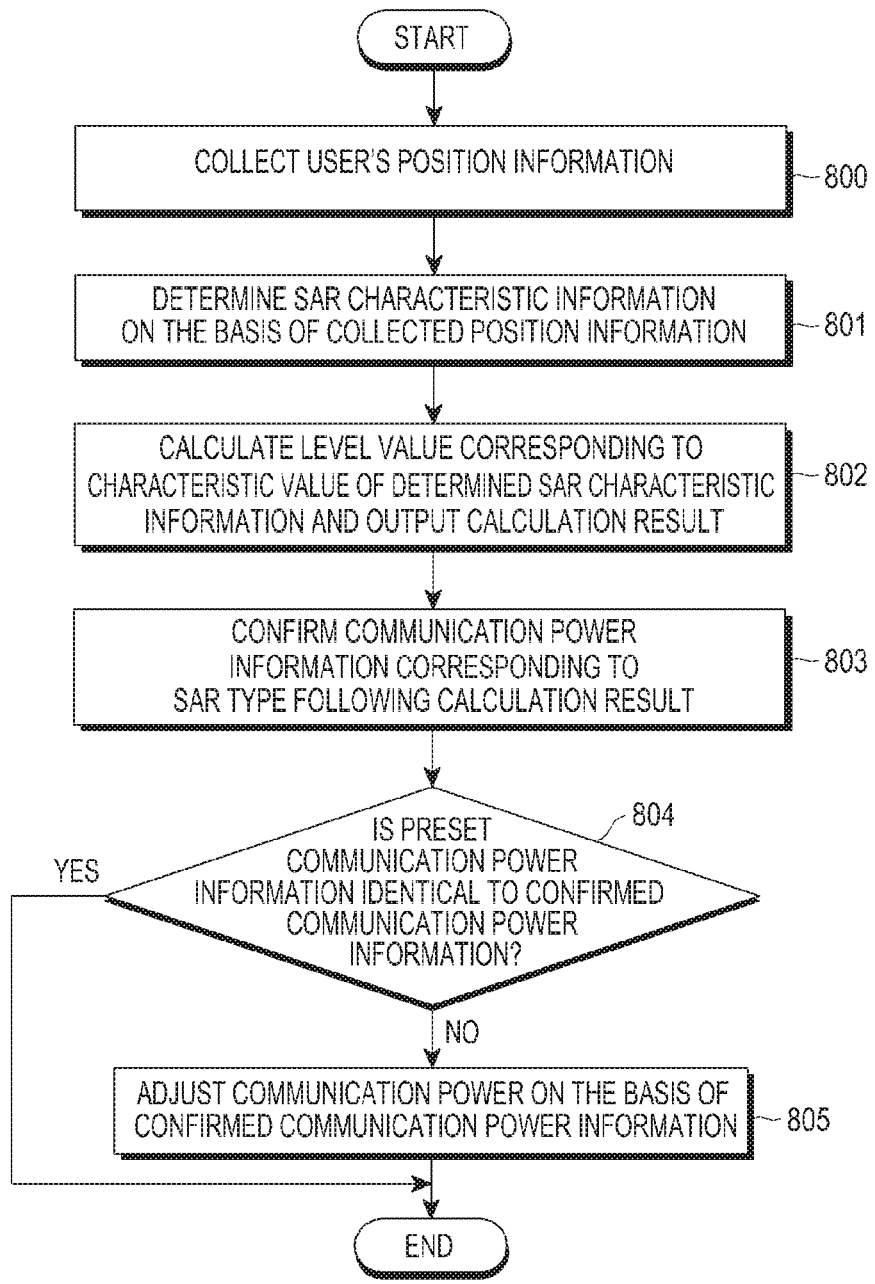
FIG. 8 is a flowchart of a method of adjusting communication power based on user position information by an electronic device according to an embodiment of the present disclosure.

FIG. 8 is a flowchart of a method of adjusting communication power based on user position information by an electronic device according to an embodiment of the present disclosure. Steps 800 to 805 may be performed through one of an electronic device 101, 104, 201, 400, or 500, a server 106 or 410, a processor 120, 210, 401, or 501, and a program module 310.

Referring to FIG. 8, in step 800, the electronic device 500 may collect a user's position information.

According to an embodiment of the present disclosure, the electronic device 500 may receive information regarding a place, at which the user is positioned, from an external electronic device, which is positioned at a place such as a home, a workplace, a hospital, a school, or the like, or from a communication network, which is operated at the corresponding place. For example, the electronic device 500 may be provided with information regarding a representative user, which is influenced by a SAR of a place, such as a home, a workplace, a hospital, a school, or the like (for example, information including at least one (or some) of average measurement values regarding body mass index, bone density, and blood lead level).

According to an embodiment of the present disclosure, the electronic device 500 may receive the user's position information from a base station or measure the user's position information by means of a GPS, convert the position information into map information (for example, geo-fence) through a map stored in the electronic device 500, and collect the same. For example, the electronic device 500 may be provided with information regarding a representative user, which corresponds to certain map information (for example, information including at least one (or some) of average measurement values regarding body mass index, bone density, and blood lead level).

According to an embodiment of the present disclosure, the electronic device 500 may receive public information regarding peripheral electronic devices of the electronic device 500, positioned in a certain region, from a base station or from the AP (for example, at least one (or some) of personal information, position information, situation information, etc.). Such public information may be used for the common good when anonymity is guaranteed. For example, the electronic device 500 may be provided with information regarding a representative user, which corresponds to a certain region (for example, information including at least one (or some) of average measurement values regarding body mass index, bone density, and blood lead level). For example, when external electronic devices are concentrated in a certain region, the electronic device 500 may be provided with information regarding users of the corresponding external electronic devices (for example, information including at least one (or some) of average measurement values regarding body mass index, bone density, and blood lead level).

Accordingly, the electronic device 500 may confirm peripheral users, who are influenced by a SAR, not only based on position information regarding the electronic device 500, but also based on public information regarding peripheral electronic devices positioned in a certain region, assign different weights to the confirmed peripheral users, and adjust the communication power with regard to each individual user.

For example, the electronic device 500 may control the communication power, according to an individual state, such that a maximum of SAR value is 1.6 W/kg or less, in general, and may control the communication power such that, in the case of an unhealthy person, the maximum of SAR value is 1.2 W/kg. For example, in the case of a person having a low body mass index, the electronic device 500 may control the communication power such that the maximum of SAR value is 1.0 W/kg.

In step 801, the electronic device 500 may determine SAR characteristic information based on collected position information.

According to an embodiment of the present disclosure, the electronic device 500 may determine SAR characteristic information, for example, at least one (or some) of a nation, a region, a place, etc.

In step 802, the electronic device 500 may calculate a level value, which corresponds to a characteristic value of the determined SAR characteristic information, and output the calculation result.

According to an embodiment of the present disclosure, the electronic device 500 may confirm level values, which correspond to a name of a nation, a name of a region, and a name of a place, from SAR characteristic-wise level setting information stored in the memory 504, calculate the confirmed level values, and output the calculation result values. For example, the electronic device 500 may assign different weights to the level values, which have been confirmed according to SAR characteristic value, and perform calculation.

In step 803, the electronic device 500 may confirm communication power information that corresponds to a SAR type that follows the calculation result.

According to an embodiment of the present disclosure, the processor 500 may confirm a SAR type, which corresponds to a calculation result value, based on SAR type-wise communication power setting information stored in the memory 504, and confirm the amount of communication power, which corresponds to the confirmed SAR type.

In step 804, the electronic device 500 may confirm whether preset communication power information and the confirmed communication power information are identical or not and may end the operation, when the preset communication power information and the confirmed communication power information are identical, or perform step 805, when the preset communication power information and the confirmed communication power information are not identical.

According to an embodiment of the present disclosure, the electronic device 500 may determine whether a preset amount of communication power and the confirmed amount of communication power are identical or not and may perform data transmission/reception based on the preset amount of communication power, when the preset amount of communication power and the confirmed amount of communication power are identical.

In step 805, the electronic device 500 may adjust the communication power based on the confirmed communication power information.

According to an embodiment of the present disclosure, the electronic device 500 may change the preset amount of communication power to the confirmed amount of communication power, when the present amount of communication power and the confirmed amount of communication power are not identical, and may perform data transmission/reception on the basis of the changed amount of communication power.

Accordingly, the electronic device 500 may confirm peripheral users, who are influenced by the SAR, assign different weights to the confirmed peripheral users, and adjust the communication power for each peripheral user, thereby adjusting the SAR value for each individual user.

Figure 9:
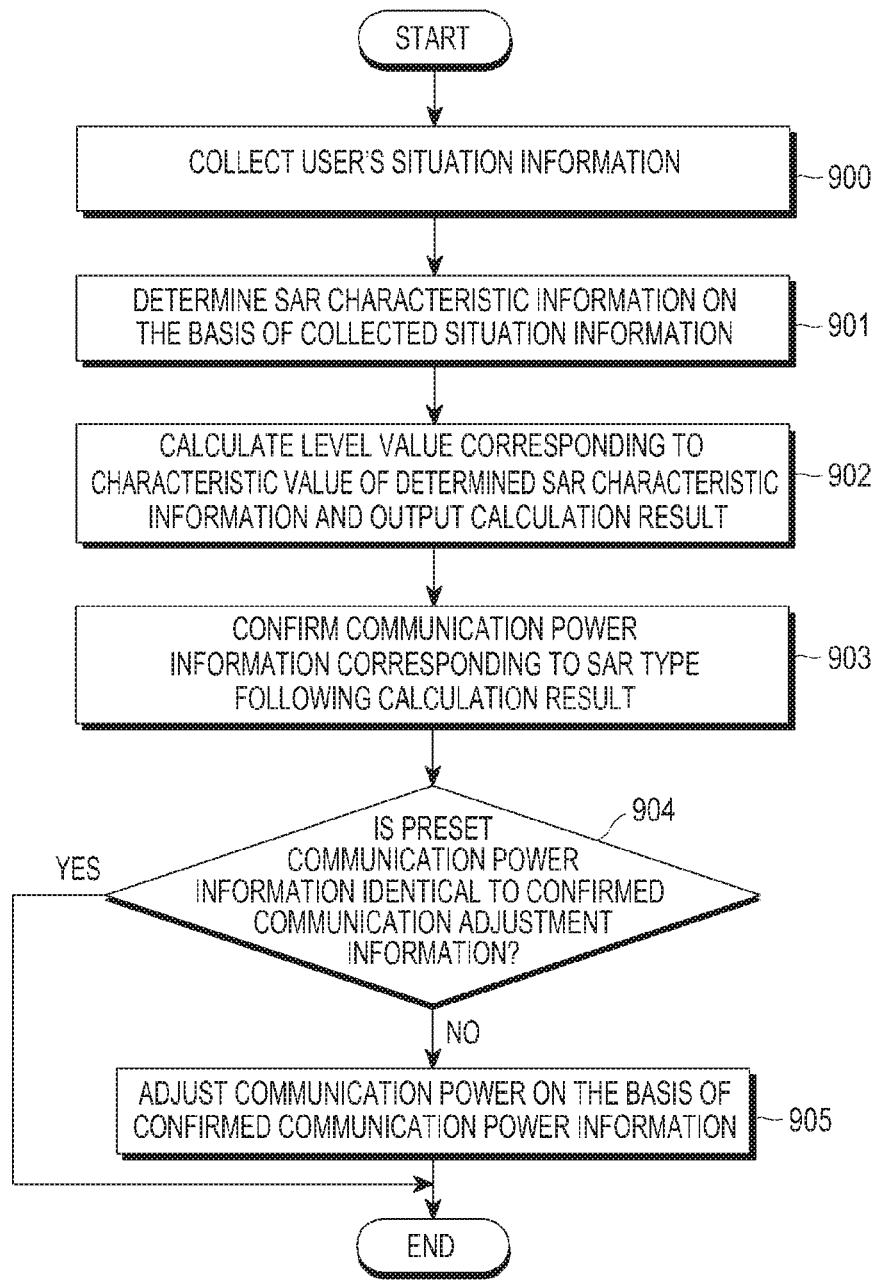
FIG. 9 is a flowchart of a method of adjusting communication power based on user situation information by an electronic device according to an embodiment of the present disclosure.

FIG. 9 is a flowchart of a method of adjusting communication power based on user situation information by an electronic device according to an embodiment of the present disclosure. Steps 900 to 905 may be performed through one of an electronic device 101, 104, 201, 400, or 500, a server 106 or 410, a processor 120, 210, 401, or 501, and a program module 310.

Referring to FIG. 9, in step 900, the electronic device 500 may collect the user's situation information.

According to an embodiment of the present disclosure, the electronic device 500 may provide a user interface for receiving an input of the user situation from the user and may receive situation information (for example, at least one (or some) of pregnancy preparation, prenatal education, child care, etc.), which depends on the user input, through the user interface.

According to an embodiment of the present disclosure, the electronic device 500 may collect the user's situation information (for example, schedule) through a schedule application, which manages the user's schedule. In such a case, not only the user's situation information, but also situation information regarding the counterpart user (for example, spouse) related to the user may be provided and used to adjust the communication power.

According to an embodiment of the present disclosure, the electronic device 500 may receive state information regarding group members from a cloud server, which stores state information (for example, at least one (or some) of health information, position information, situation information, etc.) regarding the group members, or from a control device, which manages electronic devices related to the group members. The electronic device 500 may confirm at least one group member, who is influenced by the SAR to a large extent, inside the group on the basis of received state information regarding the group members, assign a weight to the confirmed at least one group member, and adjust the communication power accordingly.

In step 901, the electronic device 500 may determine SAR characteristic information based on the collected situation information.

According to an embodiment of the present disclosure, the electronic device 500 may determine SAR characteristic information, for example, at least one (or some) of age, gender, schedule, group member's age, gender, position, and schedule.

In step 902, the electronic device 500 may calculate a level value, which corresponds to the characteristic value of the determined SAR characteristic information, and output the calculation result.

According to an embodiment of the present disclosure, the electronic device 500 may confirm level values, which correspond to age, gender, group member's age, gender, position, schedule, etc., from SAR characteristic-wise level setting information stored in the memory 504, calculate the confirmed level values, and output the calculation result values.

In step 903, the electronic device 500 may confirm communication power information that corresponds to a SAR type that follows the calculation result.

According to an embodiment an embodiment of the present disclosure, the processor 500 may confirm a SAR type, which corresponds to a calculation result value, based on a SAR type-wise communication power setting information stored in the memory 504, and confirm the amount of communication power, which corresponds to the confirmed SAR type.

In step 904, the electronic device 500 may confirm whether preset communication power information and the confirmed communication power information are identical or not and may end the operation, when the preset communication power information and the confirmed communication power information are identical, or perform step 905, when the preset communication power information and the confirmed communication power information are not identical.

According to an embodiment of the present disclosure, the electronic device 500 may determine whether a preset amount of communication power and the confirmed amount of communication power are identical or not and may perform data transmission/reception based on the preset amount of communication power, when the preset amount of communication power and the confirmed amount of communication power are identical.

In step 905, the electronic device 500 may adjust the communication power based on the confirmed communication power information.

According to an embodiment of the present disclosure, the electronic device 500 may change the preset amount of communication power to the confirmed amount of communication power, when the present amount of communication power and the confirmed amount of communication power are not identical, and may perform data transmission/reception based on the changed amount of communication power.

Figure 10A:
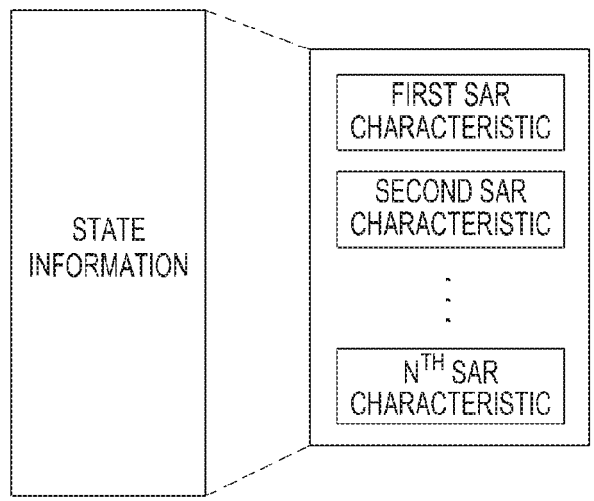
FIGS. 10A and 10B are diagrams illustrating a method of confirming communication power information corresponding to SAR characteristic information, which has been determined by determining SAR characteristic information from health information, according to an embodiment of the present disclosure.
Figure 10B:
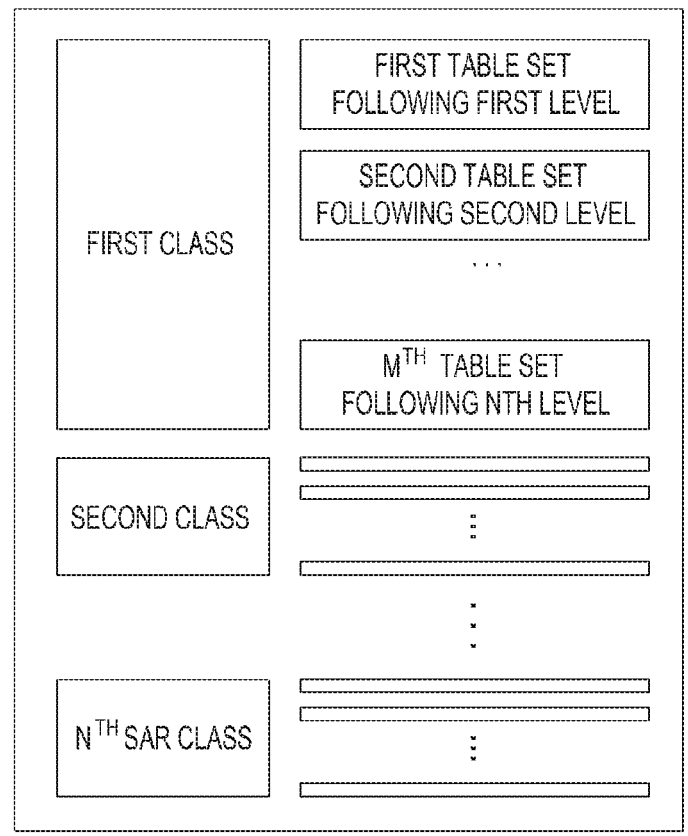

FIGS. 10A and 10B are diagrams illustrating a method of confirming communication power information corresponding to SAR characteristic information, which has been determined by determining SAR characteristic information from health information, according to an embodiment of the present disclosure.

Referring to FIGS. 10A and 10B, the electronic device 500 may determine a first SAR characteristic, a second SAR characteristic, . . . an $n^{th}$ SAR characteristic from a user's state information (for example, health information, position information, situation information, etc.) as illustrated in FIG. 10A. According to an embodiment of the present disclosure, the first SAR characteristic, the second SAR characteristic, . . . and the $n^{th}$ SAR characteristic may be information regarding age, gender, body mass index, bone density, blood lead level, a nation, a region, a place, a schedule, a group, etc.

According to an embodiment of the present disclosure, the electronic device 500 may calculate characteristic values regarding the first SAR characteristic, the second SAR characteristic, . . . and the $n^{th}$ SAR characteristic, output the calculation result, and confirm communication power information, which corresponds to the calculation result, based on SAR type-wise communication power setting information. The SAR type-wise communication power setting information may include, as illustrated in FIG. 10B, a first table set, which follows the first level, a second table set, which follows the second level, . . . an $m^{th}$ table set, which follows the $n^{th}$ level, the first to $m^{th}$ table sets corresponding to the first class; at least one level-wise table set, which correspond to the second class; and at least one level-wise table set, which corresponds to the $n^{th}$ class. The numerals n and m may be natural numbers.

According to an embodiment of the present disclosure, when the confirmed communication power information is the first table set, which follows the first level, and which corresponds to the first class, the electronic device 500 may adjust the amount of transmission power or reception power of the electronic device 500 using the confirmed first table set.

FIG. 11 is a diagram illustrating a screen that provides health information in connection with a health care application according to an embodiment of the present disclosure.

Referring to FIG. 11, the health care application may provide an execution screen, which includes measurement values regarding blood glucose level, pulse, blood pressure, body fat, weight, body mass index, bone density, blood lead level, etc. per month, per day, etc.

According to an embodiment of the present disclosure, among the measurement values regarding blood glucose level, pulse, blood pressure, body fat, weight, body mass index, bone density, blood lead level, etc., which have been collected through the health care application, measurement values regarding body mass index, bone density, blood lead level, etc., which correspond to SAR characteristics, may be determined. The electronic device 500 may confirm level values, which correspond to the measurement values, from SAR characteristic-wise level setting information, calculate the confirmed level values, and may output the calculation result value. The processor 500 may confirm a SAR type, which corresponds to the calculation result value, based on SAR type-wise communication power setting information, and confirm the amount of communication power, which corresponds to the confirmed SAR type.

FIG. 12 is a diagram illustrating SAR characteristic-wise level setting information according to an embodiment of the present disclosure.

Referring to FIG. 12, the SAR characteristic-wise level setting information may be configured as a table, and a level value, which corresponds to SAR characteristic information (for example, body mass, bone density, blood lead level, etc.), and which follows at least one characteristic value range, may be set.

For example, when a measured body mass index is 17 kg/m$^2$, bone density is 200 mg/cm$^2$, and blood lead level is 40 μg/dl, the level value corresponding to body mass index may be 3, the level value corresponding to bone density may be 3, and the level value corresponding to blood lead level may be 3.

According to an embodiment of the present disclosure, the electronic device 500 may perform a calculation regarding the level values using a calculation algorithm and may output the calculation result. The electronic device 500 may set different weights with regard to SAR characteristic-wise level values, due to the SAR influence or for the sake of convenience in calculation.

According to an embodiment, the calculation algorithm may be given as in following Equation (1):

$$F(y)=F(A\text{-level}3)\times a+F(B\text{-level}3)\times b+F(C\text{-level}3)\times c \quad (1)$$

F(y) may indicate a calculation result value; F(A-level 3) may indicate a calculation result value regarding a level value (for example, 3) that corresponds to body mass index; F(B-level 3) may indicate a calculation result value regarding a level value (for example, 3) that corresponds to bone density; and F(C-level 3) may indicate a level value (for example, 3) that corresponds to blood lead level. According to an embodiment of the present disclosure, a may indicate a weight value that depends on body mass index, b may indicate a weight that depends on bone density, and c may indicate a weight that depends on blood lead level. The values for a, b, and c may be set as different values due to the SAR influence or for the sake of convenience in calculation.

FIG. 13 is a diagram illustrating SAR grade-wise communication power setting information according to an embodiment of the present disclosure.

Referring to FIG. 13, the SAR grade-wise communication power setting information may be configured as a table, and at least one table may be set so as to correspond to the grade that follows at least one calculation result range.

For example, when the calculation result value is 3.7, the electronic device 400 may confirm a first table, which corresponds to the first grade, from the SAR grade-wise communication power setting information and may adjust the communication power of the electronic device 500 using the confirmed first table.

FIG. 14 is a diagram illustrating SAR grade-related level-wise communication power setting information according to an embodiment of the present disclosure.

Referring to FIG. 14, the level-wise communication power setting information, which follows the SAR grade, may be set as a table; a level may be set so as to correspond to at least one calculation result range that follows at least one grade; and first to $n^{th}$ tables may be set so as to correspond to the levels that have been set.

For example, when the calculation result value is 3.7, the electronic device 500 may confirm a fourth table, which corresponds to the fourth level of the first grade, from the level-wise communication power setting information, which follows the SAR grades, and may adjust the communication power of the electronic device 500 using the confirmed fourth table.

The SAR characteristic-wise level setting information and the SAR type-wise communication power setting information is not limited to the above descriptions, but may be set variously.

Figure 15:
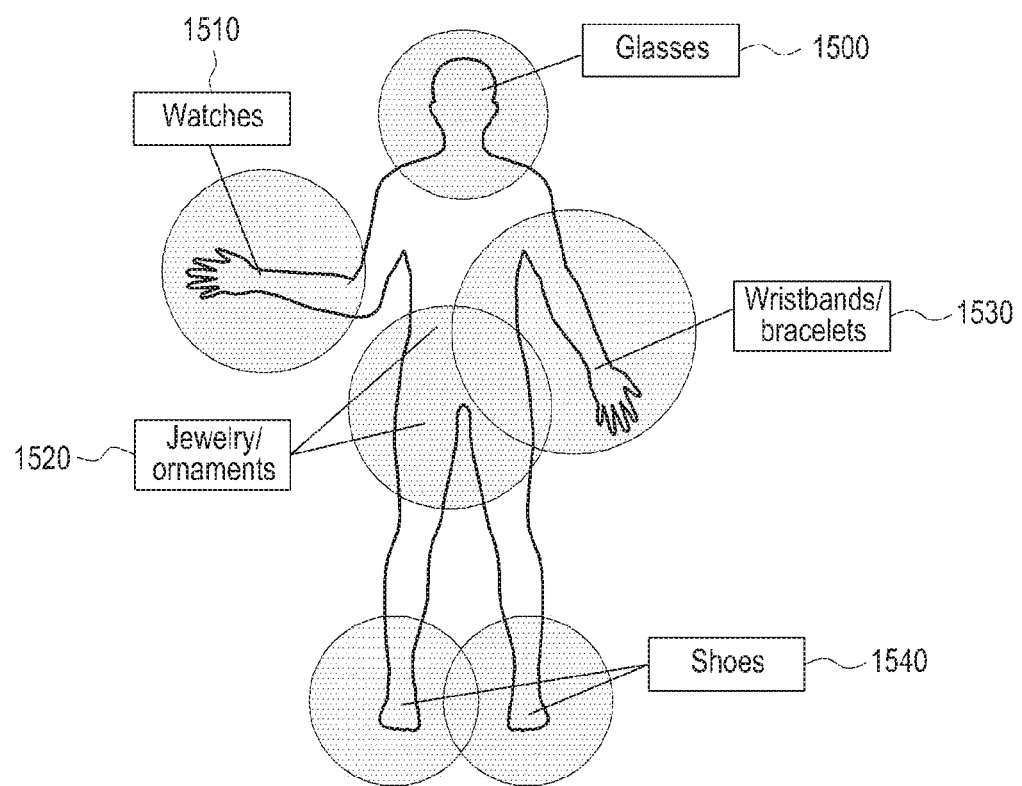
FIGS. 15 and 16 are diagrams illustrating a method of adjusting communication power based on device information regarding an electronic device and at least one wearable device, which is attached to a user's body, according to an embodiment of the present disclosure.
Figure 16:
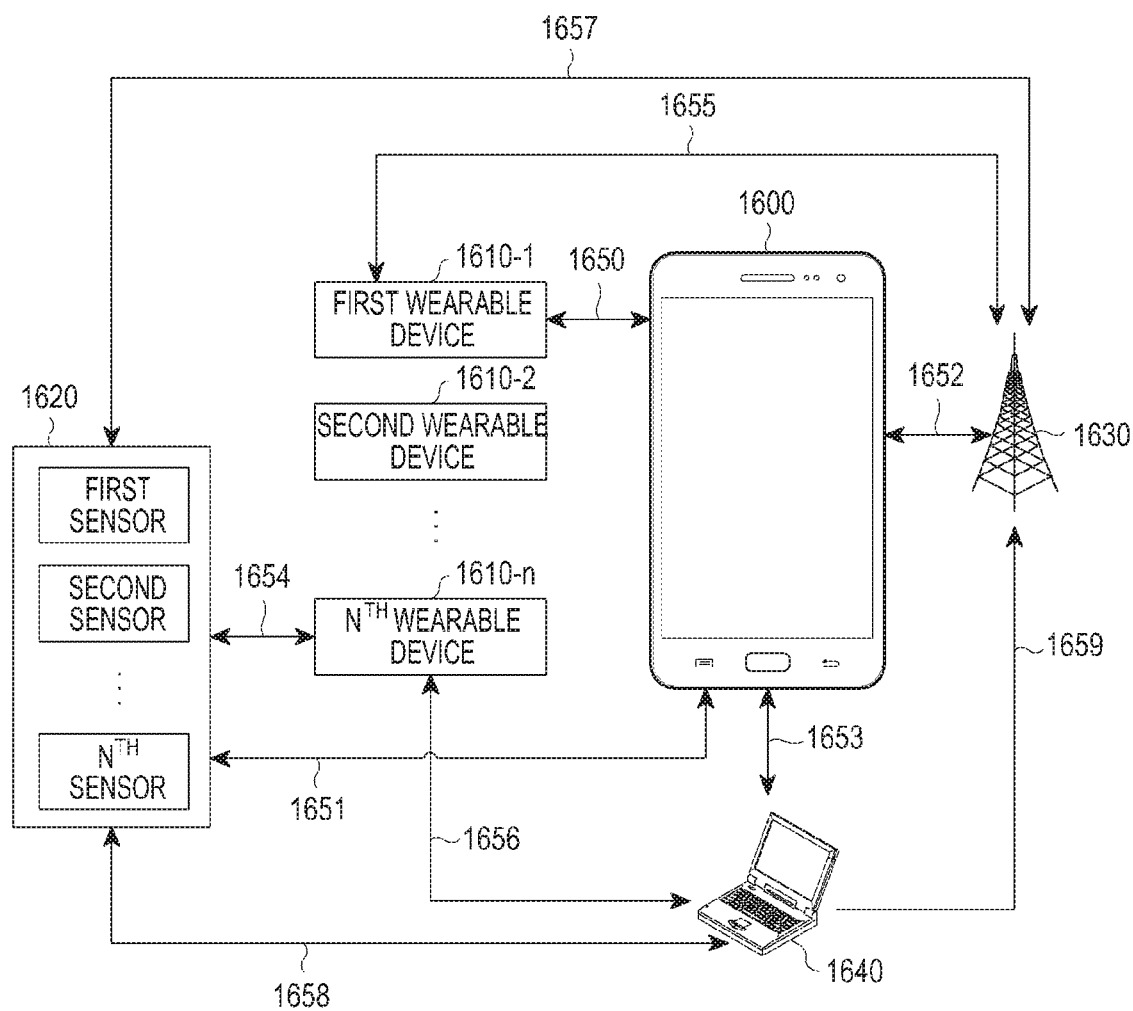

FIGS. 15 and 16 are diagrams illustrating a method of adjusting communication power based on device information regarding an electronic device and at least one wearable device, which is attached to a user's body, according to an embodiment of the present disclosure.

Referring to FIG. 15, a user may have at least one wearable device, such as glasses 1500, a watch 1510, an accessory 1520, a bracelet 1530, shoes 1540, etc., or at least one sensor, besides an electronic device, mounted on the user. According to an embodiment of the present disclosure, the wearable device may include a display that is exposed via a part of the housing. The housing may include a connection portion, and the connection portion may be coupled to at least a part of the housing, thereby surrounding a part of the user's body. The connection portion may include a separable structure, which may be used to separate the connection portion from the part of the user's body.

Referring to FIG. 16, the electronic device 1600 may communicate with at least one wearable device 1610-1, 1610-2, ... 1610-$n$, at least one sensor 1620, a base station 1630, an external electronic device 1640, etc. The communication paths among such devices may include a first communication path 1650 resulting from communication between the electronic device 1600 and the at least one wearable device 1610-1, 1610-2, ... 1610-$n$; a second communication path 1651 resulting from communication between the electronic device 1600 and the at least one sensor 1620; a third communication path 1652 resulting from communication between the electronic device 1600 and the base station 1630; a fourth communication path 1653 resulting from communication between the electronic device 1600 and the external electronic device 1640; a fifth communication path 1654 resulting from communication between the at least one wearable device 1610-1, 1610-2, ... 1610-$n$ and the at least one sensor 1620; a sixth communication path 1655 resulting from communication between the at least one wearable device 1610-1, 1610-2, ... 1610-$n$ and the base station 1630; a seventh communication path 1656 resulting from communication between the at least one wearable device 1610-1, 1610-2, ... 1610-$n$ and the external electronic device 1640; an eight communication path 1657 resulting from communication between the at least one sensor 1620 and the base station 1630; a ninth communication path 1658 resulting from communication between the at least one sensor 1620 and the external electronic device 1640; and a tenth communication path 1659 resulting from communication between the base station 1630 and the external electronic device 1640.

According to an embodiment of the present disclosure, the electronic device 1600 may receive device information from at least one of the at least one wearable device 1610-1, 1610-2, 1610-$n$, the at least one sensor 1620, the base station 1630, the external electronic device 1640, etc. through at least some of the communication paths and may determine SAR characteristic information, which is related to the SAR, based on received device information. The electronic device 1600 may confirm communication power information based on determined SAR characteristic information and may adjust the communication power related to at least one of the electronic device 1600, the at least one wearable device 1610-1, 1610-2, ... 1610-$n$, the at least one sensor 1620, the base station 1630, the external electronic device 1640, etc. based on confirmed communication power information. For example, the SAR characteristic information may include SAR information, communication scheme information, transmission (Tx) frequency band information, communication power information, information regarding an application (app) that is being executed or content that is being executed, etc.

According to an embodiment of the present disclosure, the electronic device 1600 may store SAR characteristic-wise level setting information, which has levels set so as to correspond to at least one threshold characteristic value range with regard to each of at least one SAR characteristic, and SAR type-wise communication power setting information, which has SAR type-wise communication power information set so as to correspond to at least one threshold calculation result range. The electronic device 1600 may request a server, which provides SAR characteristic-wise level setting information and SAR type-wise communication power information, to provide the same and may receive the same.

According to an embodiment of the present disclosure, the electronic device 1600 may confirm level information, which corresponds to at least one SAR characteristic value, based on SAR characteristic-wise level setting information stored in the memory 230, calculate the confirmed level information, and output the calculation result.

For example, if the SAR of the first wearable device 1610-1 is 2.01, the SAR of the second wearable device 1610-2 is 1.47, and the SAR of the electronic device 1600 is 2.13, the SAR resulting from SAR overlapping (for example, maximum SAR) may be 5.61. In such a case, the electronic device 1600 may confirm level information, which corresponds to respective SARs of the first wearable device 1610-1, the second wearable device 1610-2, and the electronic device 1600, from SAR characteristic-wise level setting information, in order to lower the SAR (for example, the maximum SAR) to be less than or equal to a reference value (for example, 4.0 W/kg), calculate the confirmed level information, and output respective calculation results regarding the first wearable device 1610-1, the second wearable device 1610-2, and the electronic device 1600.

According to an embodiment of the present disclosure, the processor 1600 may confirm a SAR type, which corresponds to the calculation result regarding the electronic device 1600, based on SAR type-wise communication power setting information and may confirm communication power information, which corresponds to the confirmed SAR type. The electronic device 1600 may adjust the communication power of the electronic device 1600 based on confirmed communication power information.

According to an embodiment of the present disclosure, the electronic device 1600 may confirm a SAR type, which corresponds to the calculation result regarding the first wearable device 1610-1, from SAR type-wise communication power setting information and may confirm communication power information, which corresponds to the confirmed SAR type. The electronic device 1600 may confirm a SAR type, which corresponds to the calculation result value regarding the second wearable device 1610-2, from SAR type-wise communication power setting information and may confirm communication power information, which corresponds to the confirmed SAR type.

According to an embodiment of the present disclosure, the electronic device 1600 may generate a control signal for controlling the communication power of the first wearable device 1610-1 according to communication power information regarding the first wearable device 1610-1 and may transfer the generated control signal to the first wearable device 1610-1. The electronic device 1600 may generate a control signal for controlling the communication power of the second wearable device 1610-2 according to communication power information regarding the second wearable device 1610-2 and may transfer the generated control signal to the second wearable device 1610-2. The first wearable device 1610-1 and the second wearable device 1610-2, which have received the control signals, may adjust the communication power of each.

According to an embodiment of the present disclosure, the communication power related to each of the electronic device 1600, the first wearable device 1610-1, and the second wearable device 1610-2 may be adjusted.

According to an embodiment of the present disclosure, the communication power related to at least one of the electronic device 1600, the first wearable device 1610-1, and the second wearable device 1610-2 may be adjusted, thereby lowering the SAR.

Figure 17:
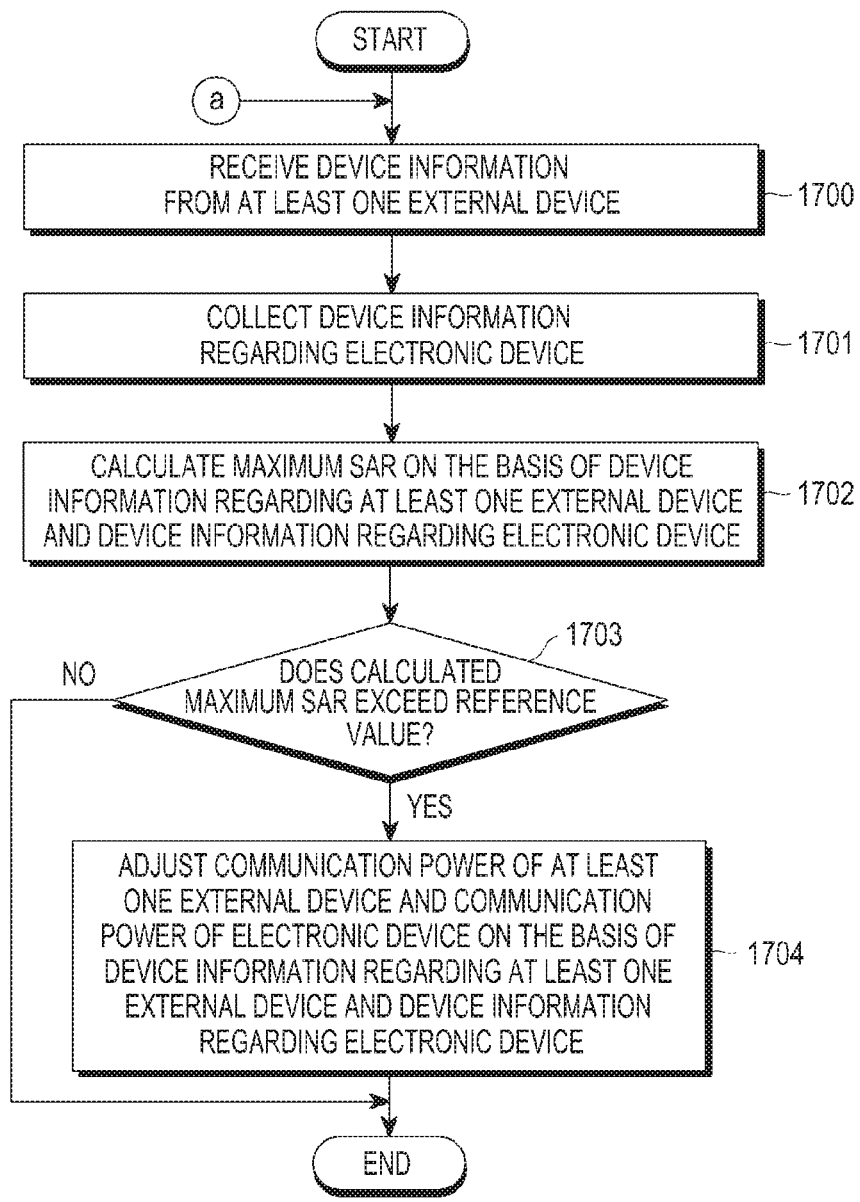
FIG. 17 is a flowchart of a method of adjusting communication power based on device information regarding an electronic device and at least one external device according to an embodiment of the present disclosure.

FIG. 17 is a flowchart of a method of adjusting communication power based on device information regarding an electronic device and at least one external device according to an embodiment of the present disclosure. Steps 1700 to 1704 may be performed through one of an electronic device 101, 104, 201, 400, 500, or 1600, a server 106 or 410, a processor 120, 210, 401, or 501, a program module 310, at least one wearable device 1610-1, 1610-2, . . . 1610-$n$, at least one sensor 1620, and an external electronic device 1640.

Referring to FIG. 17, in step 1700, the electronic device 1600 may receive device information from at least one external device. For example, the at least one external device may include at least one selected from at least one wearable device 1610-1, 1610-2, . . . 1610-$n$, at least one sensor 1620, a base station 1630, and an external electronic device 1640.

In step 1701, the electronic device 1600 may collect device information regarding the electronic device 1600. The device information may include a name of the electronic device 1600, distance information, SAR information, RF-related information including a communication scheme, transmission (TX) frequency band information, communication power information, information regarding the app (or function) that is being executed or content that is being executed, etc.

In step 1702, the electronic device 1600 may calculate the SAR (for example, a maximum SAR) based on device information regarding at least one external device and device information regarding the electronic device. For example, the SAR of each of the at least one wearable device 1610-1, 1610-2, . . . 1610-$n$, the at least one sensor 1620, the base station 1630, and the external electronic device 1640 may be confirmed, and a sum of the confirmed SARs may be calculated.

In step 1703, the electronic device 1600 may determine whether a calculated SAR (for example, a maximum SAR) exceeds a reference value or not and may perform step 1704, when the SAR (for example, maximum SAR) exceeds the reference value, or end the operation when the SAR (for example, a maximum SAR) does not exceed the reference value.

In step 1704, the electronic device 1600 may adjust a communication power of at least one device selected from at least one external device and the electronic device 1600 based on device information regarding the at least one external device and device information regarding the electronic device 1600.

Figure 18:
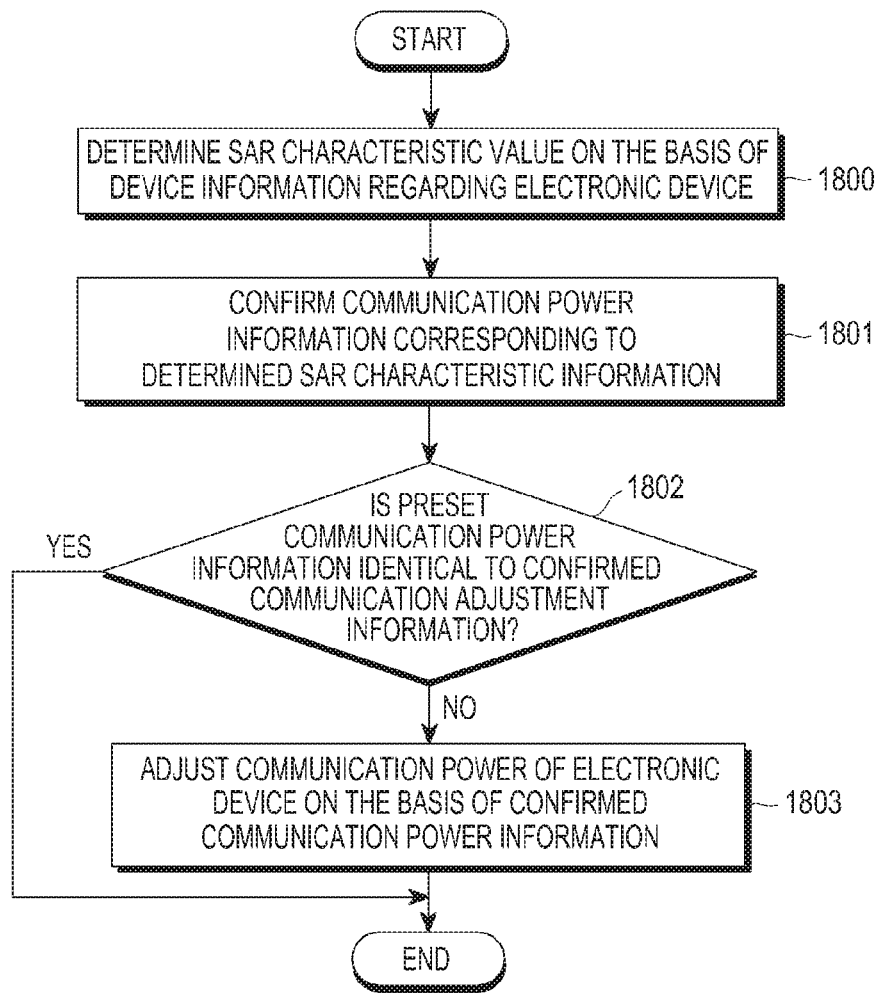
FIG. 18 is a flowchart of a method of adjusting communication power of an electronic device according to an embodiment of the present disclosure.

FIG. 18 is a flowchart of a method of adjusting communication power of an electronic device according to an embodiment of the present disclosure. Steps 1800 to 1803 may be performed through one of an electronic device 101, 104, 201, 400, 500, or 1600, a server 106 or 410, processor 120, 210, 401, or 501, a program module 310, at least one wearable device 1610-1, 1610-2, . . . 1610-$n$, at least one sensor 1620, and an external electronic device 1640.

Referring to FIG. 18, in step 1800, the electronic device 1600 may determine SAR characteristic information based on device information regarding the electronic device 1600. For example, the SAR characteristic information may include SAR information (for example, 2.01, 1.47 W/kg, etc.), communication scheme information (for example, WiFi, BT, LTE, etc.), transmission frequency band information (for example, 2.4 GHz, 5 GHz, 7 GHz, etc.), communication power information (for example, first table, second table, etc.), etc.

In step 1801, the electronic device 1600 may confirm communication power information that corresponds to the determined SAR characteristic information. For example, the electronic device 1600 may confirm level information, which corresponds to at least one piece of SAR characteristic information, based on SAR characteristic-wise level setting information, calculate the confirmed level information, and output the calculation result. The processor 1600 may confirm a SAR type, which corresponds to the calculation result regarding the electronic device 1600, based on SAR type-wise communication power setting information and confirm communication power information, which corresponds to the confirmed SAR type.

In step 1802, the electronic device 1600 may determine whether preset communication power information and the confirmed communication power information are identical or not and may end the operation, when the preset communication power information and the confirmed communication power information are identical, or perform step 1803, when the preset communication power information and the confirmed communication power information are not identical.

In step 1803, the electronic device 1600 may adjust the communication power of the electronic device 1600 based on confirmed communication power information. For example, the electronic device 1600 may change a current amount of transmission power to the confirmed amount of transmission power and may communicate accordingly.

Figure 19:
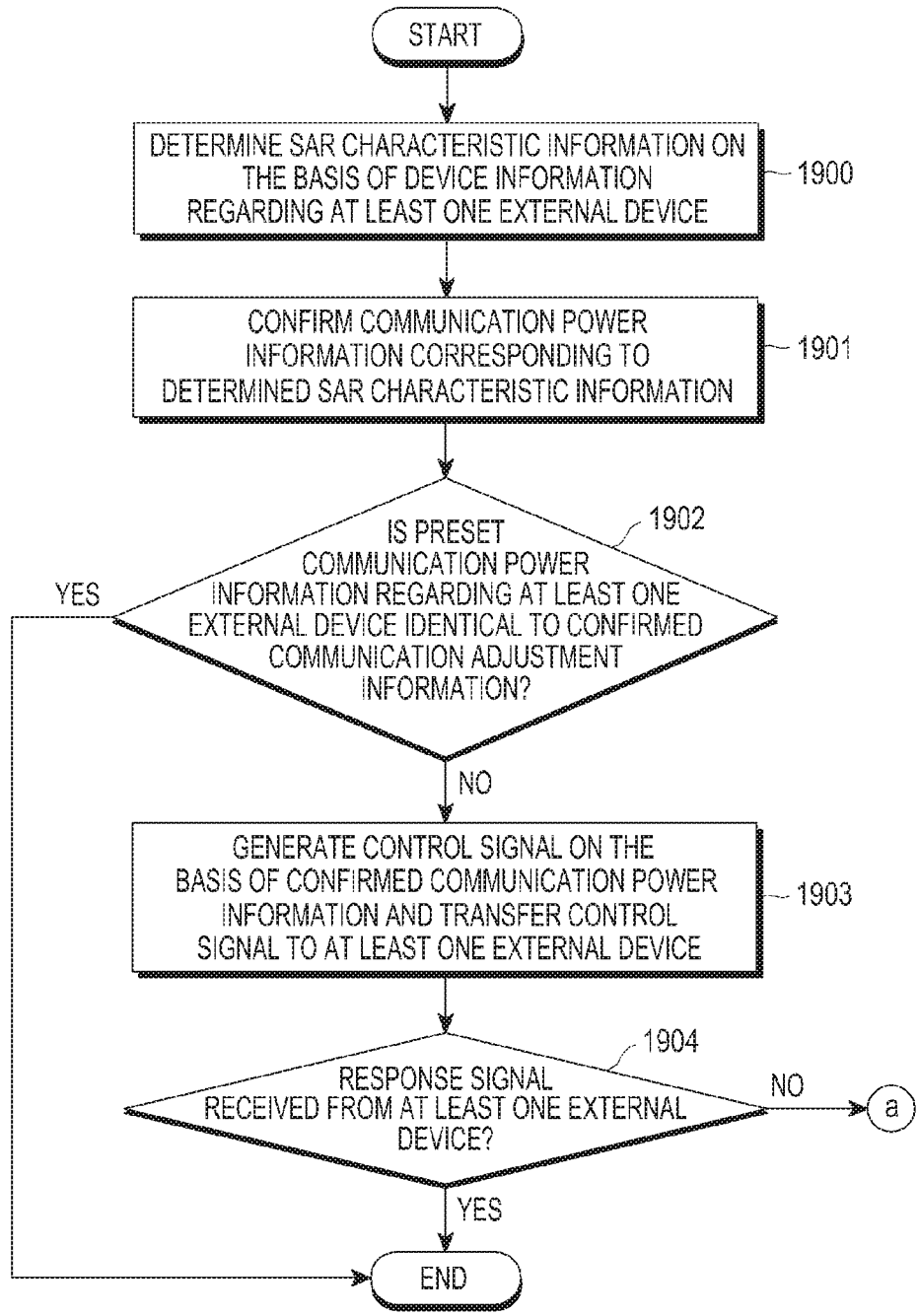
FIG. 19 is a flowchart of a method of adjusting communication power of at least one external device according to an embodiment of the present disclosure.

FIG. 19 is a flowchart of a method of adjusting communication power of at least one external device according to an embodiment of the present disclosure. Steps 1900 to 1804 may be performed through one of an electronic device 101, 104, 201, 400, 500, or 1600, a server 106 or 410, a processor 120, 210, 401, or 501, a program module 310, at least one wearable device 1610-1, 1610-2, . . . 1610-$n$, at least one sensor 1620, and an external electronic device 1640.

Referring to FIG. 19, in step 1900, the electronic device 1600 may determine SAR characteristic information based on device information regarding at least one external device. For example, the electronic device 1600 may determine SAR characteristic information from device information regarding at least one selected from the first wearable device 1610-1, the second wearable device 1610-2, . . . the $n^{th}$ wearable device 1610-$n$, the at least one sensor 1620, and the external electronic device 1640.

In step 1901, the electronic device 1600 may confirm communication power information that corresponds to the determined SAR characteristic information.

According to an embodiment of the present disclosure, the electronic device 1600 may confirm level information, which corresponds to SAR characteristic information regarding the $n^{th}$ wearable device 1610-$n$, based on SAR characteristic-wise level setting information, calculate the confirmed level information, and output the calculation result. The electronic device 1600 may confirm a SAR type, which corresponds to the calculation result regarding the $n^{th}$ wearable device 1610-$n$, based on SAR type-wise communication power setting information, and confirm communication power information, which corresponds to the confirmed SAR type.

According to an embodiment of the present disclosure, the electronic device 1600 may confirm level information, which corresponds to SAR characteristic information regarding the external electronic device 1640, based on SAR characteristic-wise level setting information, calculate the confirmed level information, and output the calculation result. The processor 1600 may confirm a SAR type, which corresponds to the calculation result regarding the external electronic device 1640, based on SAR type-wise communication power setting information and confirm communication power information, which corresponds to the confirmed SAR type.

In step 1902, the electronic device 1600 may determine whether preset communication power information regarding at least one external device and the confirmed communication power information are identical or not and may end the operation, when the preset communication power information regarding at least one external device and the confirmed communication power information are identical, or perform step 1903, when the preset communication power information regarding at least one external device and the confirmed communication power information are not identical. For example, the electronic device 1600 may confirm preset communication power information from device information regarding at least one external device.

In step 1903, the electronic device 1600 may generate a control signal based on confirmed communication power information and transfer the same to at least one external device. For example, the electronic device 1600 may generate a control signal for adjusting (or changing) the amount of communication power of at least one external device according to the confirmed communication power information and may transfer each of the generated control signals to the at least one external device.

In step 1904, the electronic device 1600 may determine whether a response signal is received from the at least one external device or not and may end the operation, when a response signal is received, or perform, in step a, steps 1700 to 1704 of FIG. 17 and steps 1900 to 1904 of FIG. 19 when no response signal is received.

According to an embodiment of the present disclosure, at least one external device (for example, a second electronic device) may receive a control signal for adjusting the amount of communication power from the electronic device 1600. The at least one external device may compare a current amount of communication power with the amount of communication power according to the received control signal and may communicate based on a current amount of communication power, when the current amount of communication power and the amount of communication power according to the received control signal are identical, or adjust (or change) the current amount of communication power to the amount of communication power according to the received control signal, when the current amount of communication power and the amount of communication power according to the received control signal are not identical, and communicate. The at least one external device may generate a response signal, in response to the control signal, and may transfer the same to the electronic device 1600.

Figure 20:
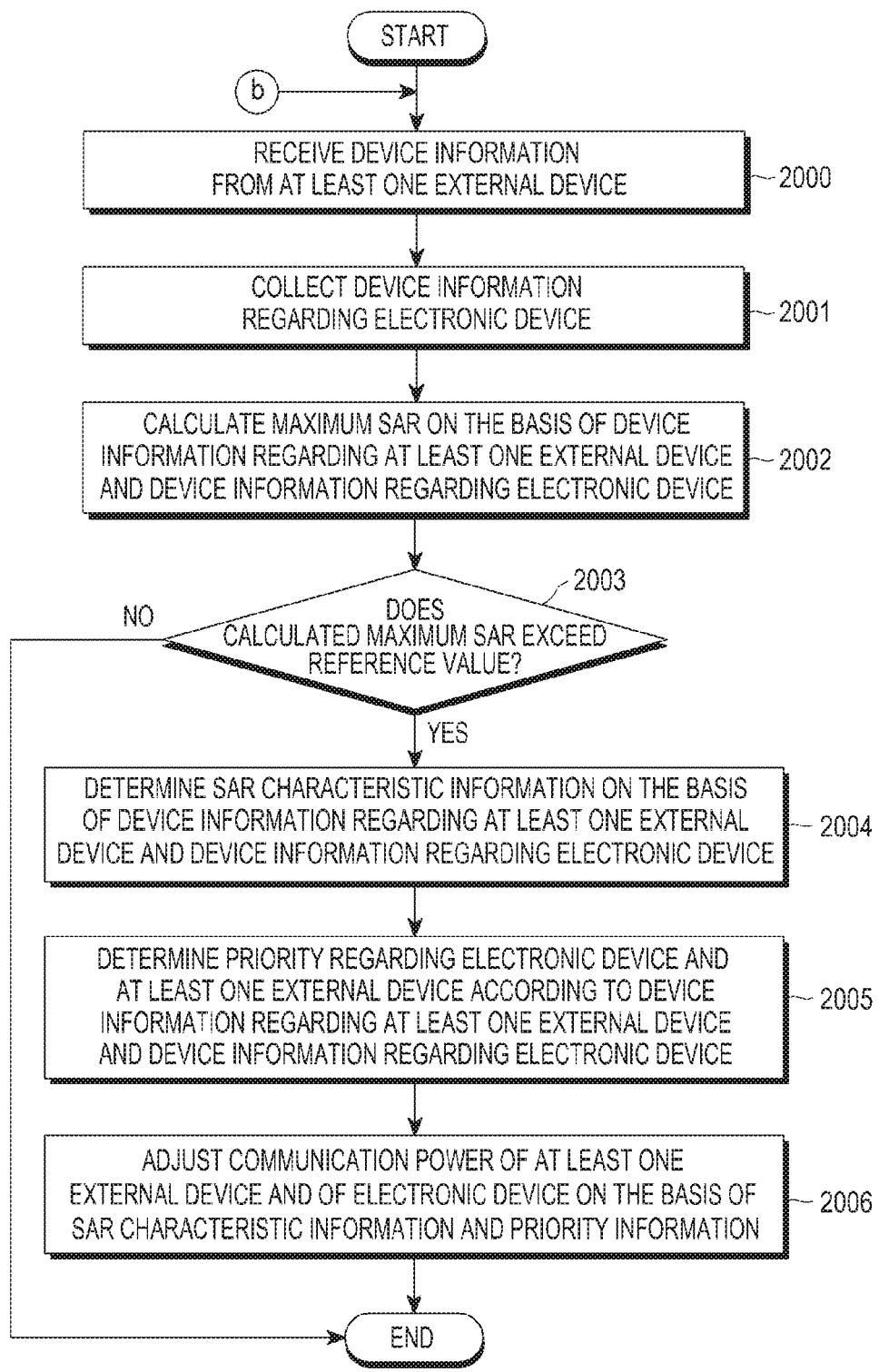
FIG. 20 is a flowchart of a method of adjusting communication power based on device information regarding at least one external device and an electronic device, as well as priority thereof, according to an embodiment of the present disclosure.

FIG. 20 is a flowchart of a method of adjusting communication power based on device information regarding at least one external device and an electronic device, as well as priority thereof, according to an embodiment of the present disclosure. Steps 2000 to 2006 may be performed through one of an electronic device 101, 104, 201, 400, 500, or 1600, a server 106 or 410, a processor 120, 210, 401, or 501, a program module 310, at least one wearable device 1610-1, 1610-2, . . . 1610-$n$, at least one sensor 1620, and an external electronic device 1640.

Referring to FIG. 20, in step 2000, the electronic device 1600 may receive device information from at least one external device.

In step 2001, the electronic device 1600 may collect device information regarding the electronic device 1600.

In step 2002, the electronic device 1600 may calculate a SAR (for example, a maximum SAR) based on the device information regarding at least one external device and device information regarding the electronic device 1600.

In step 2003, the electronic device 1600 may determine whether a calculated SAR (for example, a maximum SAR) exceeds a reference value or not and may perform step 2004, when the SAR (for example, a maximum SAR) exceeds the reference value, or end the step when the SAR (for example, a maximum SAR) does not exceed the reference value.

In step 2004, the electronic device 1600 may determine SAR characteristic information based on the device information regarding at least one external device and device information regarding the electronic device 1600. For example, electronic device 1600 may determine SAR characteristic information, which includes SAR information, communication scheme information, transmission (TX) frequency band information, communication power information, information regarding an app that is being executed or content that is being executed, etc., from device information regarding at least one external device. The electronic device 1600 may determine SAR characteristic information from device information regarding the electronic device 1600 as well.

In step 2005, the electronic device 1600 may determine a priority regarding at least one external device and the electronic device 1600 based on the device information regarding the at least one external device and device information regarding the electronic device 1600. For example, assuming that the application currently executed by the electronic device 1600 is a telephone application, the application currently executed by the first wearable device 1601-1 is a music player, and the application currently executed by the second wearable device 1610-2 is a health care application, the electronic device 1600 may confirm preset priority setting information and determine the priority regarding the electronic device 1600, the first wearable device 1610-1, and the second wearable device 1610-2. For example, the preset priority setting information may have ranks set so as to correspond to at least one application. In the case of a telephone application currently executed by the electronic device, the need to provide the same in real time with a better service quality than other applications may give it a higher rank than other applications.

For example, the rank of a telephone application in the priority setting information may be higher than that of a music player application and a health care application, and the rank of a music player application may be higher than the rank of a health care application. In this case, the rank of the electronic device 1600 may be the first rank, the rank of the first wearable device 1610-1 may be the second rank, and the rank of the second wearable device 1610-2 may be the third rank.

In step 2006, the electronic device 1600 may adjust a communication power of at least one of the at least one external device and the electronic device 1600 based on the SAR characteristic information and priority information.

According to an embodiment of the present disclosure, the electronic device 1600 may confirm level information, which corresponds to SAR characteristic information regarding the electronic device 1600, based on the SAR characteristic-wise level setting information, calculate the confirmed level information, and output the calculation result. The electronic device 1600 may confirm a SAR type, which corresponds to the calculation result based on SAR type-wise communication power setting information and may confirm communication power information, which corresponds to the confirmed SAR type.

The electronic device 1600 may select communication power information, which has a lesser amount of communication power set therein than the confirmed communication power information, based on the priority information regarding the electronic device 1600.

According to an embodiment of the present disclosure, the electronic device 1600 may confirm level information, which corresponds to SAR characteristic information regarding at least one external device, based on the SAR characteristic-wise level setting information, calculate the confirmed level information, and output the calculation result.

The electronic device 1600 may confirm a SAR type, which corresponds to the calculation result based on SAR type-wise communication power setting information and confirm communication power information, which corresponds to the confirmed SAR type. For example, the electronic device 1600 may confirm communication power information regarding the first wearable device 1610-1 and communication power information regarding the second wearable device 1610-2.

The electronic device 1600 may select communication power information, which has a greater amount of communication power set therein than the confirmed communication power information, based on the priority information regarding at least one external device. For example, the electronic device 1600 may select communication power information, which has a greater amount of communication power set therein than the confirmed communication power information, based on the priority information regarding the first wearable device 1610-1. In addition, the electronic device 1600 may select communication power information, which has a greater amount of communication power set therein than the confirmed communication power information, based on the priority information regarding the second wearable device 1610-2.

Since the rank of the first wearable device 1610-1 is higher than the rank of the second wearable device 1610-2, the electronic device 1600 may select communication power information, which has a greater amount of communication power set therein than the selected communication power information regarding the first wearable device 1610-1, as communication power information regarding the second wearable device 1610-2.

According to an embodiment of the present disclosure, the electronic device 1600 may adjust the communication power of the electronic device 1600 according to the selected communication power information regarding the electronic device 1600 and may adjust the communication power regarding at least one external device according to selected communication power information regarding the at least one external device.

As a result, the SAR (for example, a maximum SAR) that depends on the amount of communication power, which has been adjusted according to communication power information regarding the electronic device 1600, the amount of communication power, which has been adjusted according to communication power information regarding the first wearable device 1610-1, and the amount of communication power, which has been adjusted according to communication power information regarding the second wearable device 1610-2, may become less than or equal to the threshold value.

Figure 21:
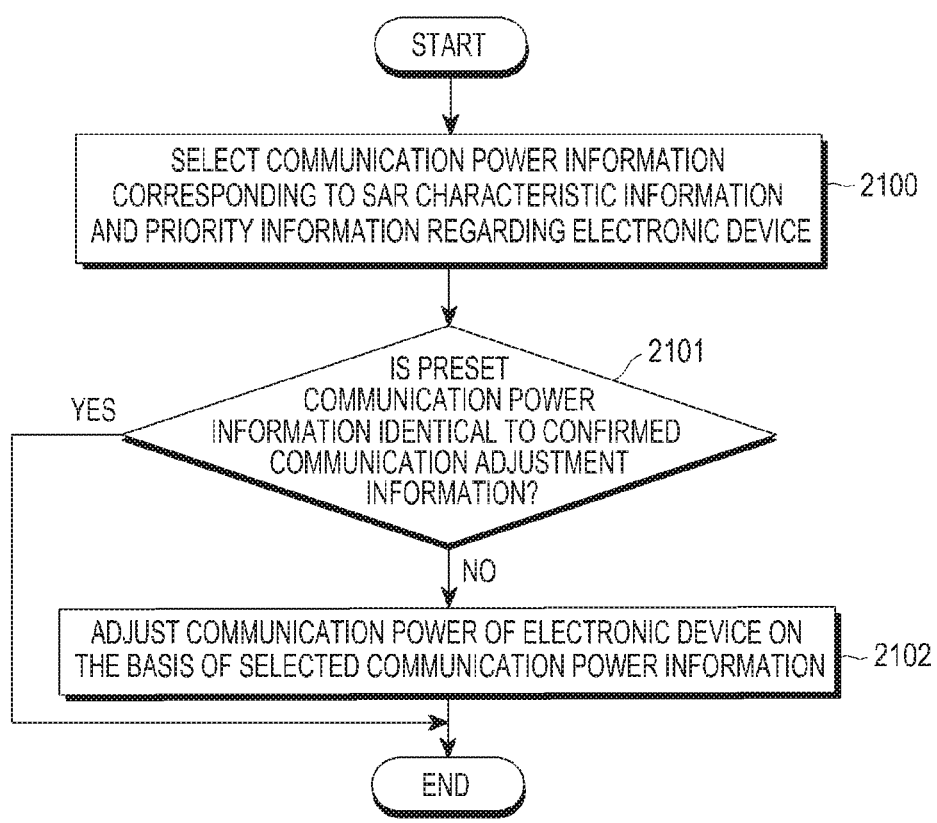
FIG. 21 is a flowchart of a method of adjusting communication power of an electronic device based on priority information according to an embodiment of the present disclosure.

FIG. 21 is a flowchart of a method of adjusting communication power of an electronic device based on priority information according to an embodiment of the present disclosure. Steps 2100 to 2102 may be performed through one of an electronic device 101, 104, 201, 400, 500, or 1600, a server 106 or 410, a processor 120, 210, 401, or 501, a program module 310, at least one wearable device 1610-1, 1610-2, . . . 1610-*n*, at least one sensor 1620, and an external electronic device 1640.

Referring to FIG. 21, in step 2100, the electronic device 1600 may select communication power information that corresponds to SAR characteristic information and priority information regarding the electronic device 1600.

According to an embodiment of the present disclosure, the electronic device 1600 may confirm level information, which corresponds to SAR characteristic information regarding the electronic device 1600, based on SAR characteristic-wise level setting information, calculate the confirmed level information, and output the calculation result. The electronic device 1600 may confirm a SAR type, which corresponds to the calculation result based on SAR type-wise communication power setting information and confirm communication power information, which corresponds to the confirmed SAR type.

The electronic device 1600 may confirm priority information regarding the electronic device 1600 and, when the electronic device 1600 has the highest priority, may select communication power information, which has a lesser amount of communication power set therein than the confirmed communication power information, as communication power information regarding the electronic device 1600.

In step 2101, the electronic device 1600 may determine whether preset communication power information and selected communication power information are identical or not and may end the operation, when they are identical, or perform step 2102 when they are not identical.

In step 2102, the electronic device 1600 may adjust the communication power of the electronic device 1600 based on the selected communication power information.

Figure 22:
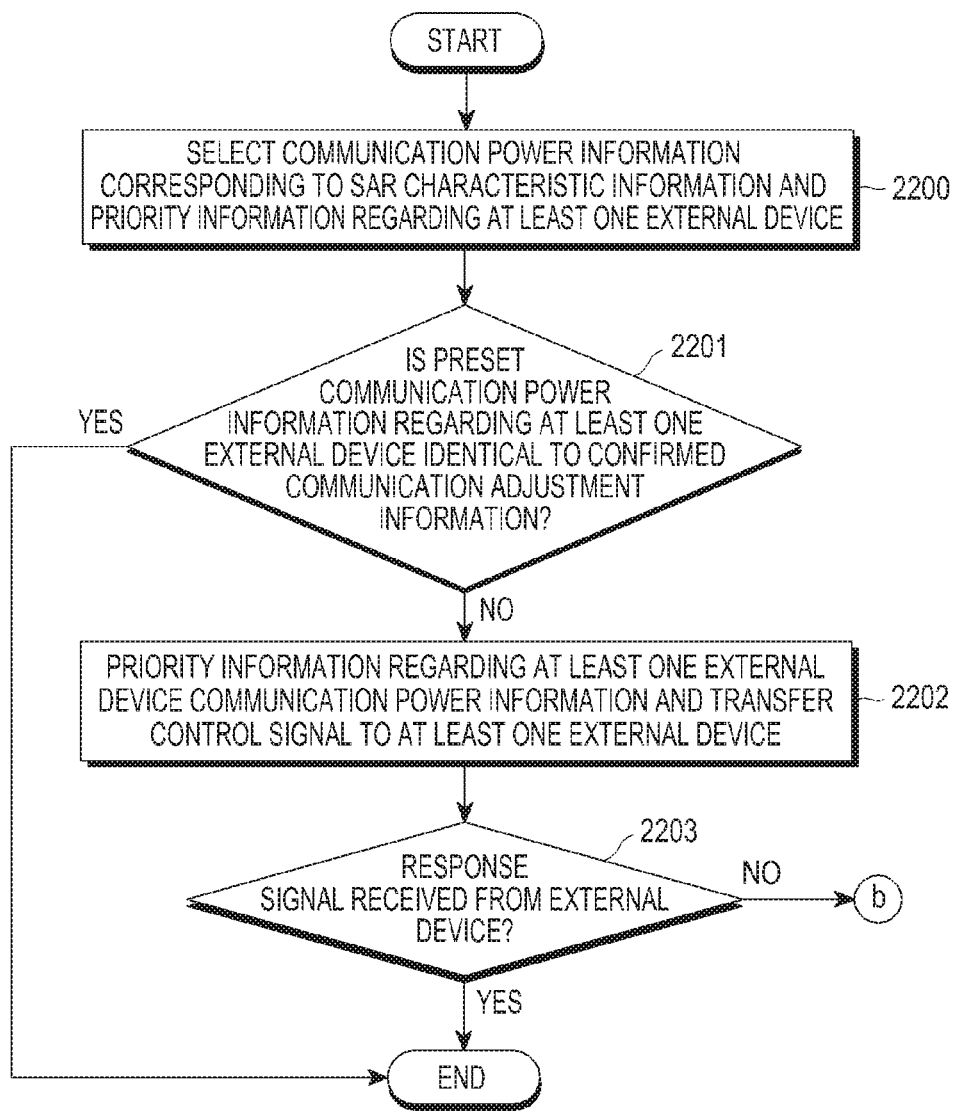
FIG. 22 is a flowchart of a method of adjusting communication power of at least one external device based on priority information according to an embodiment of the present disclosure.

FIG. 22 is a flowchart of a method of adjusting communication power of at least one external device based on priority information according to an embodiment of the present disclosure. Steps 2200 to 2203 may be performed through one of an electronic device 101, 104, 201, 400, 500, or 1600, a server 106 or 410, a processor 120, 210, 401, or 501, a program module 310, at least one wearable device 1610-1, 1610-2, . . . 1610-*n*, at least one sensor 1620, and an external electronic device 1640.

Referring to FIG. 22, in step 2200, the electronic device 1600 may select communication power information that corresponds to SAR characteristic information and priority information regarding at least one external device.

According to an embodiment of the present disclosure, the electronic device 1600 may confirm level information, which corresponds to SAR characteristic information regarding at least one external device, based on SAR characteristic-wise level setting information, calculate the confirmed level information, and output each calculation result. The electronic device 1600 may confirm a SAR type, which corresponds to each calculation result based on SAR type-wise communication power setting information and may confirm communication power information, which corresponds to the confirmed SAR type. The electronic device 1600 may confirm priority information regarding at least one external device and may select communication power information, which has a greater amount of communication power set therein than confirmed communication power information regarding the at least one external device, based on the confirmed priority information as communication power information regarding the at least one external device.

In step 2201, the electronic device 1600 may determine whether preset communication power information regarding the at least one external device and selected communication adjustment information are identical or not and may end the operation, when they are identical, or perform step 2202 when they are not identical.

In step 2202, the electronic device 1600 may generate a control signal based on the selected communication power information and transfer the same to at least one external device. For example, the electronic device 1600 may generate a control signal for adjusting (or changing) the amount of communication power of at least one external device according to the selected amount of communication power and may transfer each of the generated control signals to the at least one external device.

In step 2203, the electronic device 1600 may determine whether a response signal is received from the at least one external device or not and may end the operation, when a response signal is received, or perform, in step b, steps 2000 to 2006 of FIG. 20 and steps 2200 to 2203 of FIG. 22 when no response signal is received.

According to an embodiment of the present disclosure, at least one external device (for example, a second electronic device) may receive a control signal for adjusting an amount of communication power from the electronic device 1600. The at least one external device may compare a current amount of communication power with an amount of communication power according to a received control signal and may communicate based on the current amount of communication power, when the current amount of communication power and the amount of communication power according to the received control signal are identical, or adjust (or change) the current amount of communication power to the amount of communication power according to the received control signal, when the current amount of communication power and the amount of communication power according to the received control signal are not identical, and communicate. The at least one external device may generate a response signal, in response to the control signal, and may transfer the same to the electronic device 1600.

FIG. 23 is a diagram of SAR characteristic information regarding at least one external device and an electronic device according to an embodiment of the present disclosure.

Referring to FIG. 23, SAR characteristic information regarding at least one external device (for example, first wearable device 1610-1, second wearable device 1610-2, . . . and n$^{th}$ wearable device 1610-*n*, etc.) and an electronic device 1600 may include information such as a SAR, a communication scheme, a TX frequency band, communication power information, an application that is being executed, content that is being executed, etc.

For example, first SAR characteristic information regarding the first wearable device 1610-1 may include "SAR: 2.01 W/kg, communication scheme: WiFi, TX frequency band: 2.4 GHz, communication power information: third table, application being executed: music player, content being executed: music."

For example, second SAR characteristic information regarding the second wearable device 1610-2 may include "SAR: 1.47 W/kg, communication scheme: BT, TX frequency band: 2.4 GHz, communication power information: first table, application being executed: health care."

For example, third SAR characteristic information regarding the electronic device 1600 may include "SAR: 2.13 W/kg, communication scheme: LTE, TX frequency band: 7 GHz, communication power information: fourth table, application being executed: call."

According to an embodiment an of the present disclosure, the electronic device 1600 may confirm communication power information, which corresponds to first SAR characteristic information regarding the first wearable device 1610-1, may generate a control signal for controlling the communication power of the first wearable device 1610-1 according to the confirmed communication power information, and may transfer the same to the first wearable device 1610-1.

The electronic device 1600 may confirm communication power information, which corresponds to second SAR characteristic information regarding the second wearable device 1610-2, may generate a control signal for controlling the communication power of the second wearable device 1610-2 according to the confirmed communication power information, and may transfer the same to the second wearable device 1610-2.

The electronic device 1600 may confirm communication power information, which corresponds to third SAR characteristic information regarding an electronic device 2600, and may adjust the communication power of the electronic device 2600 according to the confirmed communication power information.

FIG. 24 is a diagram illustrating SAR characteristic-wise level setting information according to an embodiment of the present disclosure. The SAR characteristic-wise level setting information may be configured as a table as illustrated in FIG. 24.

According to an embodiment of the present disclosure, an electronic device 1600 may confirm a level value that corresponds to at least one characteristic value (for example, "SAR: 2.01, communication scheme: WiFi, frequency band: 2.4 GHz" etc.) of a first wearable device 1610-1. For example, the electronic device 1600 may confirm a level value (for example, 3) that corresponds to the SAR of the first wearable device 1610-1, a level value (for example, 1) that corresponds to the communication scheme, and a level value (for example, 1) that corresponds to the Tx frequency band.

The electronic device 1600 may calculate the confirmed level values according to a calculation algorithm, may output the calculation result, and may confirm communication power information, which corresponds to the calculation result, based on SAR type-wise communication power information as illustrated in FIG. 13 or FIG. 14.

For example, when the confirmed communication power information is the second table, the electronic device 1600 may compare preset communication power information (for example, third table) regarding the first wearable device 1610-1 with the confirmed communication power information (for example, second table).

When the preset communication power information and the confirmed communication power information are not identical, the electronic device 1600 may generate a control signal for adjusting the communication power of the first wearable device 1610-1 according to the second table and may transfer the generated control signal to the first wearable device 1610-1. The control signal may include information regarding the amount of communication power that follows the second table. Accordingly, the first wearable device 1610-1 may adjust the communication power according to the received control signal and may transfer a response signal to the electronic device 1600 as a response to the control signal.

According to an embodiment of the present disclosure, an electronic device 1600 may confirm a level value that corresponds to at least one characteristic value (for example, "SAR: 1.47, communication scheme: BT, frequency band: 2.4 GHz" etc.) of a second wearable device 1610-2. For example, the electronic device 1600 may confirm a level value (for example, 2) that corresponds to the SAR of the first wearable device 1610-2, a level value (for example, 2) that corresponds to the communication scheme, and a level value (for example, 2) that corresponds to the Tx frequency band.

The electronic device 1600 may calculate the confirmed level values according to a calculation algorithm, may output the calculation result, and may confirm communication power information, which corresponds to the calculation result, on the basis of SAR type-wise communication power information as illustrated in FIG. 13 or FIG. 14.

For example, when the confirmed communication power information is the first table, the electronic device 1600 may compare preset communication power information (for example, first table) regarding the second wearable device 1610-2 with the confirmed communication power information (for example, first table).

When the preset communication power information and the confirmed communication power information are identical, the electronic device 1600 may end the operation.

According to an embodiment of the present disclosure, the electronic device 1600 may select communication power information which has an amount of communication power greater or less than that of the confirmed communication power information, using priority information regarding the first wearable device 1610-1, the second wearable device 1610-2, and the electronic device 1600 and adjust the communication power of the first wearable device 1610-1, the second wearable device 1610-2, and the electronic device 1600 according to the selected communication power information.

Figure 25:
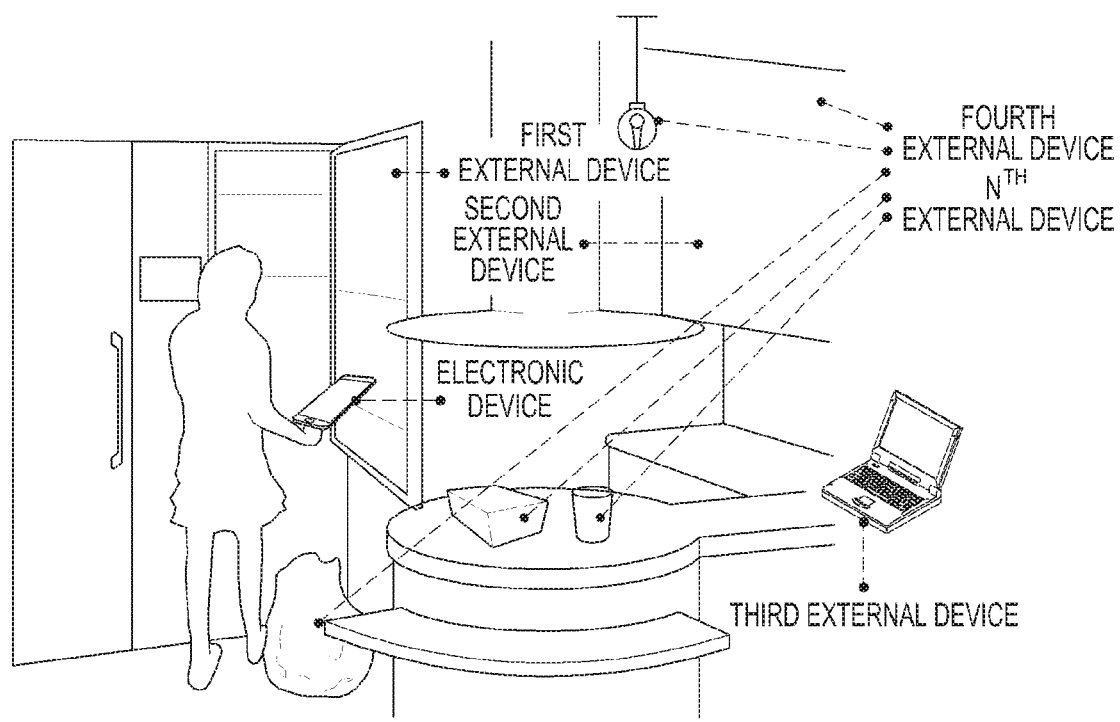
FIGS. 25 and 26 are diagrams of a method of adjusting communication power based on device information regarding an electronic device and at least one external device, which is positioned in the vicinity of a user, according to an embodiment of the present disclosure.
Figure 26:
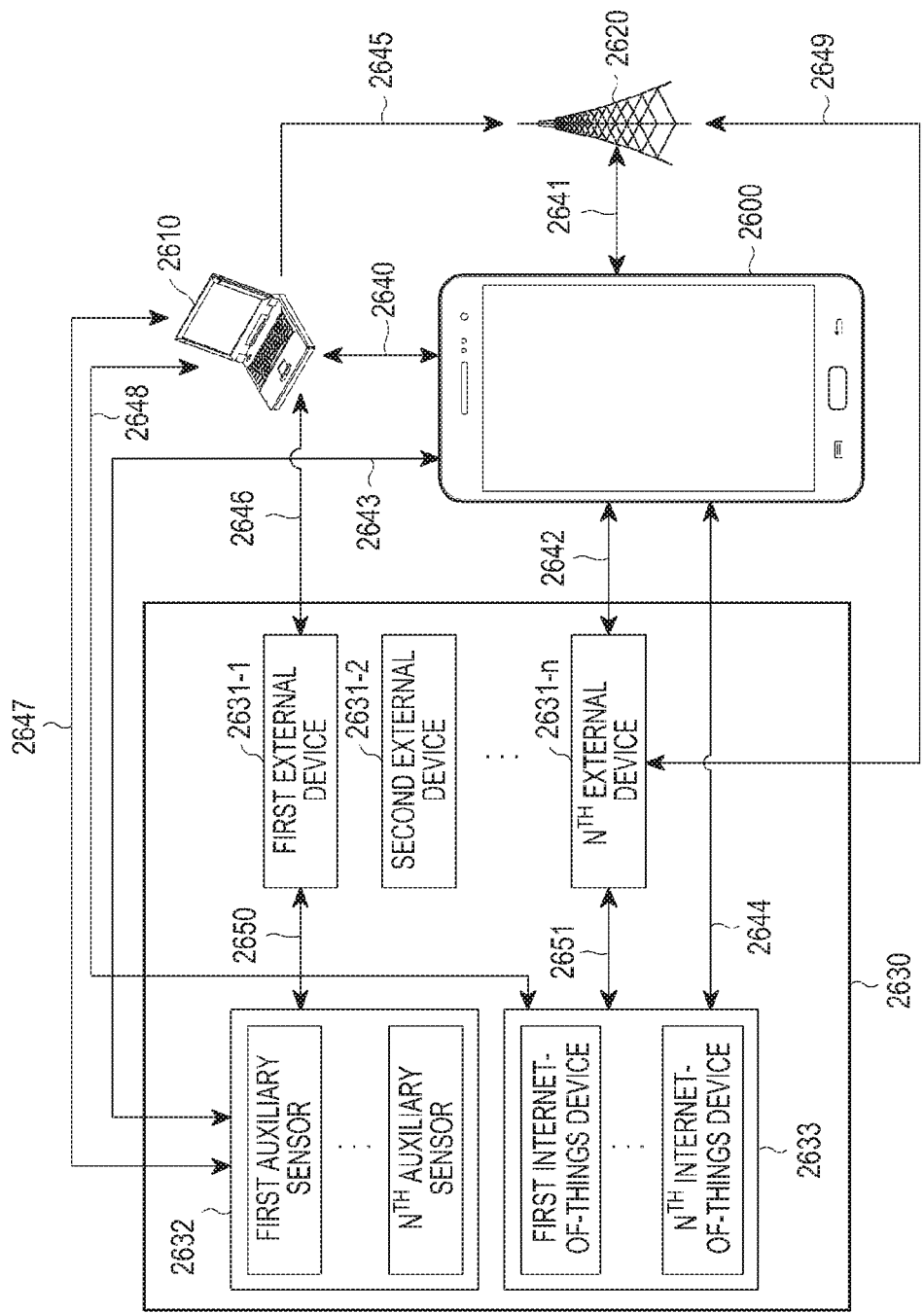

FIGS. 25 and 26 are diagrams illustrating a method for adjusting communication power based on device information regarding an electronic device and at least one external device, which is positioned in the vicinity of a user, according to an embodiment of the present disclosure.

Referring to FIG. 25, when the user is at home, there may exist, inside the home, not only an electronic device carried by the user, such as a portable terminal, but also a first external device, such as a refrigerator or a home network server, a second external device, such as a TV set, a third external device, such as a laptop, and fourth to $n^{th}$ external devices, which corresponds to IoT devices such as a lamp, a cup, a window, etc. Such external devices may be positioned stereoscopically in space and may thus form smog of electromagnetic waves due to overlapping of radiation areas in which signals are radiated.

Referring to FIG. 26, the electronic device 1600 may communicate with an external electronic device 2610, a base station 2620, a first external device 2631-1 that is positioned on a home network 2630, a second external device 2631-2, ... an $n^{th}$ external device 2631-n, at least one auxiliary sensor 2632, IoT devices 2633, etc. Communication paths among such devices may include an eleventh communication path 2640 resulting from communication between the electronic device 2600 and the external electronic device 2610; a twelfth communication path 2641 resulting from communication between the electronic device 2600 and the base station 2620; a thirteenth communication path 2642 resulting from communication between the electronic device 2600 and the at least one external device 2631-1, 2631-2, . . . 2631-*n*; a fourteenth communication path 2643 resulting from communication between the electronic device 2600 and the at least one auxiliary sensor 2632; a fifteenth communication path 2644 resulting from communication between the electronic device 2600 and the at least one IoT device 2633; a sixteenth communication path 2645 resulting from communication between the external electronic device 2610 and the base station 2620; a seventeenth communication path 2646 resulting from communication between the external electronic device 2610 and the at least one external device 2631-1, 2631-2, . . . 2631-*n*; an eighteenth communication path 2647 resulting from communication between the external electronic device 2610 and the at least one auxiliary sensor 2632; a nineteenth communication path 2648 resulting from communication between the external electronic device 2610 and the at least one IoT device 2633; a twentieth communication path 2649 resulting from communication between the at least one external device 2631-1, 2631-2, 2631-*n* and the base station 2620; a twenty-first communication path 2650 resulting from communication between the at least one external device 2631-1, 263-1, . . . 2631-*n* and the at least one auxiliary sensor 2632; a twenty-second communication path 2651 resulting from communication between the at least one external device 2631-1, 2631-2, . . . 2631-*n* and the at least one IoT device 2633; etc.

According to an embodiment of the present disclosure, the electronic device 2600 may receive device information from the external electronic device 2610, the base station 2620, the at least one external device 2631-1, 2631-2, . . . 2631-*n*, the at least one auxiliary sensor 2632, the IoT devices 2633, etc. via at least some of the communication paths and may determine radiation characteristic information, which is related to radiation, based on the received device information. The electronic device 2600 may confirm communication schedule information based on the determined radiation characteristic information and may adjust the communication schedule regarding at least one of the electronic device 2600, the external electronic device 2610, the base station 2620, the at least one external device 2631-1, 2631-2, . . . 2631-*n*, the at least one auxiliary sensor 2632, the IoT devices 2633, etc. based on the confirmed communication schedule information. The radiation characteristic information may include SAR information, RF-related information including the communication scheme, transmission frequency band information, duplexing scheme information, communication schedule information, information regarding the app that is being executed or content that is being executed, etc.

The electronic device 2600 may store radiation type-wise level setting information, which has levels set so as to correspond to at least one threshold characteristic value range with regard to each of at least one radiation characteristic, and radiation type-wise communication schedule setting information, which has radiation type-wise communication schedule information set so as to correspond to at least one threshold calculation range. According to an embodiment of the present disclosure, the electronic device 2600 may request a server, which provides radiation characteristic-wise level setting information and radiation type-wise communication power information, to provide the same and may receive the same.

The electronic device 2600 may confirm level information, which corresponds to radiation characteristic information regarding the electronic device 2600, based on the radiation characteristic-wise level setting information, calculate the confirmed level information, and output the calculation result.

For example, if the SAR of the electronic device 2600 is 2.04, the SAR of the first external device 2631-1 is 2.01, and the SAR of the second external device 2631-2 is 1.47, the SAR (for example, a maximum SAR) resulting from SAR overlapping may be 5.61. In this case, the electronic device 1600 may confirm level information, which corresponds to respective SARs of the electronic device 2600, the first external device 2631-1, and the second external device 2631-2, from radiation characteristic-wise level setting information, in order to lower the SAR (for example, a maximum SAR) to be less than or equal to a reference value (for example, 4.0 W/kg), calculate the confirmed level information, and output respective calculation results regarding the electronic device 2600, the first external device 2631-1, and the second external device 2631-2.

The processor 2600 may confirm a radiation type, which corresponds to the calculation result regarding the electronic device 2600, based on the radiation type-wise communication schedule information and may confirm communication schedule information, which corresponds to the confirmed radiation type. The electronic device 2600 may adjust the communication schedule of the electronic device 2600 based on the confirmed communication schedule information. For example, the electronic device 2600 may change the current communication schedule to the confirmed communication schedule and communicate according to the changed communication schedule.

The electronic device 2600 may confirm a radiation type, which corresponds to the calculation result regarding the first external device 2631-1, based on radiation type-wise communication schedule information and confirm communication schedule information, which corresponds to the confirmed radiation type. In addition, the electronic device 2600 may confirm a radiation type, which corresponds to the calculation result regarding the second external device 2631-2, based on the radiation type-wise communication schedule information and confirm communication schedule information, which corresponds to the confirmed radiation type.

The electronic device 2600 may generate a control signal for adjusting the communication schedule of the first external device 2631-1 according to the communication schedule information regarding the first external device 2631-1 and transfer the generated control signal to the first external device 2631-1. In addition, the electronic device 2600 may generate a control signal for adjusting the communication schedule of the second external device 2631-2 according to the communication schedule information regarding the second external device 2631-2 and transfer the generated control signal to the second external device 2631-2. As a result, the first external device 2631-1 and the second external device 2631-2, which have received the control signals, may adjust respective communication schedules. The control signals may be signals for turning off the power of at least one external device.

According to an embodiment of the present disclosure, the communication schedule related to each of the electronic device 2600, the first external device 2631-1, and the second external device 2631-2 may be adjusted.

According to an embodiment of the present disclosure, the communication schedule related to at least one of the electronic device 2600, the first external device 2631-1, and the second external device 2631-2 may be adjusted, thereby lowering the SAR.

According to an embodiment of the present disclosure, time synchronization between the electronic device 2600 and at least one external device may be performed to adjust the communication schedule of the electronic device 2600 and the communication schedule related to the at least one external device. For example, at least one of the following may be used for time synchronization: a synchronization method using a synchronization signal received from the base station 2620, a synchronization method using time information regarding a GPS-received signal, a synchronization method using a synchronization signal of a certain device inside a reference device (for example, a home network (or a local network), and a synchronization method using a synchronization signal of the base station 2620 (or a GPS).

In the case of such time synchronization, at least one synchronization signal exists; therefore, priority regarding the at least one synchronization signal may be set. The synchronization signals, which have priorities set therefor, may be used as reference signals for the schedule of communication between the electronic device 2600 and the at least one external device.

For example, the priority may be set in the order of the base station 2620, the GPS, the local network, and the reference device and, when a base station synchronization signal and a local network synchronization signal are used, the base station synchronization signal may be used first for time synchronization. Such a synchronization signal may include synchronization signal source information (for example, base station information or local network information) and may be transferred to the electronic device 2600 and to at least one external device.

The electronic device 2600 may perform time synchronization between the electronic device 2600 and at least one external device using the base station synchronization signal and may adjust the communication schedule of the electronic device 2600 and the communication schedule of the at least one external device 2631-1, 2631-2, . . . 2631-n. The electronic device 2600 may perform time synchronization between the electronic device 2600 and at least one external device 2631-1, 2631-2, . . . 2631-n using the local network synchronization signal and may adjust the communication schedule of the electronic device 2600 and the communication schedule of the at least one external device 2631-1, 2631-2, . . . 2631-n.

Figure 27:
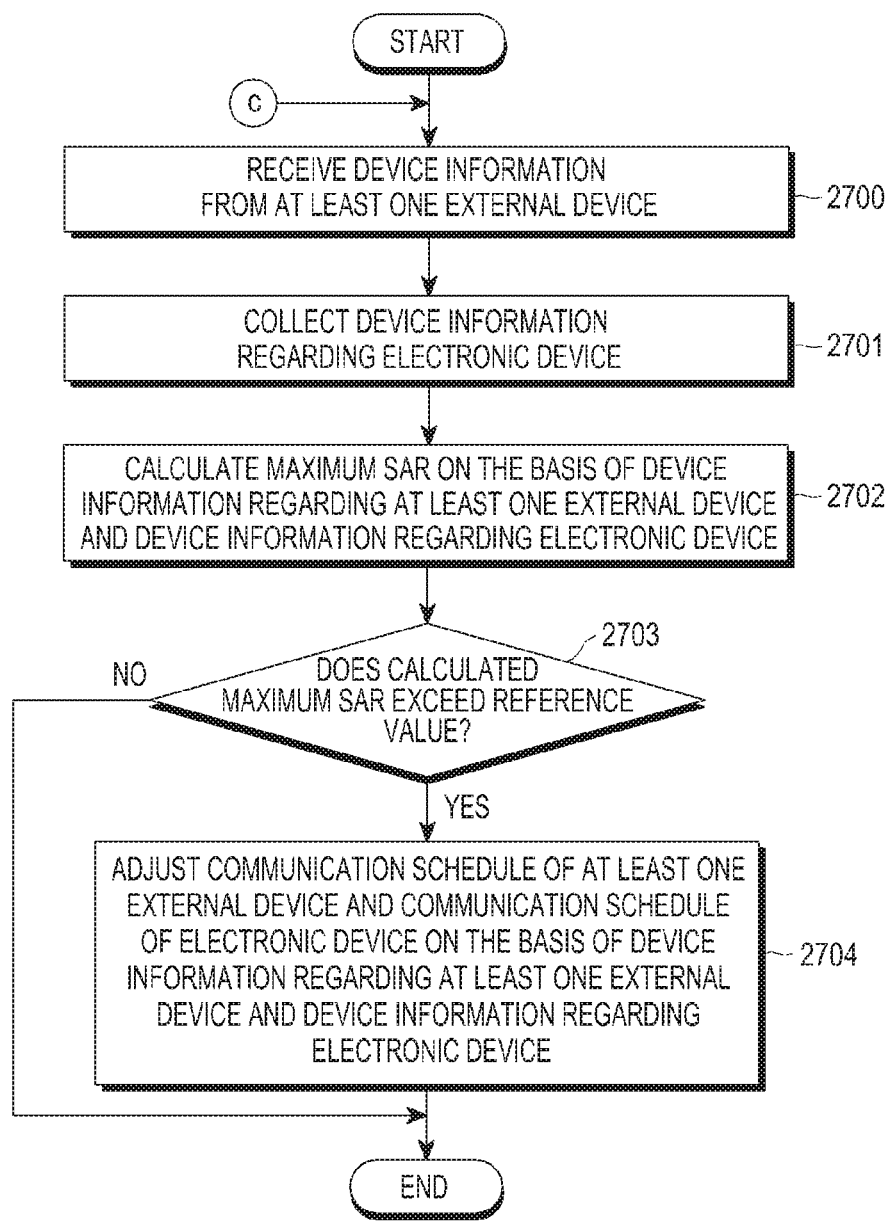
FIG. 27 is a flowchart of a method of adjusting a communication schedule based on device information regarding an electronic device and at least one external device according to an embodiment of the present disclosure.

FIG. 27 is a flowchart of a method of adjusting a communication schedule based on device information regarding an electronic device and at least one external device according to an embodiment of the present disclosure. Steps 2700 to 2704 may be performed through one of an electronic device 101, 104, 201, 400, 500, 1600, or 2600, a server 106 or 410, a processor 120, 210, 401, or 501, a program module 310, at least one wearable device 1610-1, 1610-2, . . . 1610-n, at least one sensor 1620, an external electronic device 1640 or 2610, at least one external device 2631-1, 2631-2, . . . 2631-n, at least one auxiliary sensor 2632, and at least one IoT device 2633.

Referring to FIG. 27, in step 2700, the electronic device 2600 may receive device information from at least one external device. For example, the at least one external device may include at least one of the external electronic device 2610, the base station 2620, the at least one external device 2631-1, 2631-2, . . . 2631-n, the at least one auxiliary sensor 2632, the IoT device 2633, etc.

In step 2701, the electronic device 2600 may collect device information regarding the electronic device 2600. The device information may include the name of the electronic device 2600, distance information, SAR information, RF-related information including the communication scheme, transmission (Tx) frequency band information, communication power information, communication schedule information, information regarding the app (or function) that is being executed or content that is being executed, etc.

In step 2702, the electronic device 2600 may calculate the SAR (for example, a maximum SAR) based on the device information regarding at least one external device and device information regarding the electronic device 2600. For example, respective SARs of the external electronic device 2610, the base station 2620, the at least one external device 2631-1, 2631-2, . . . 2631-n, the at least one auxiliary sensor 2632, and the IoT device 2633 may be confirmed, and the sum of the confirmed SARs may be calculated.

In step 2703, the electronic device 2600 may determine whether a calculated SAR (for example, a maximum SAR) exceeds a reference value or not and may perform step 2704, when the SAR (for example, a maximum SAR) exceeds the threshold value, or end the operation when the SAR (for example, a maximum SAR) does not exceed the threshold value.

In step 2704, the electronic device 2600 may adjust the communication schedule of at least one external device and the electronic device 2600 (or at least one device selected from the at least one external device and the electronic device 2600) based on the device information regarding the at least one external device and device information regarding the electronic device 2600.

Figure 28:
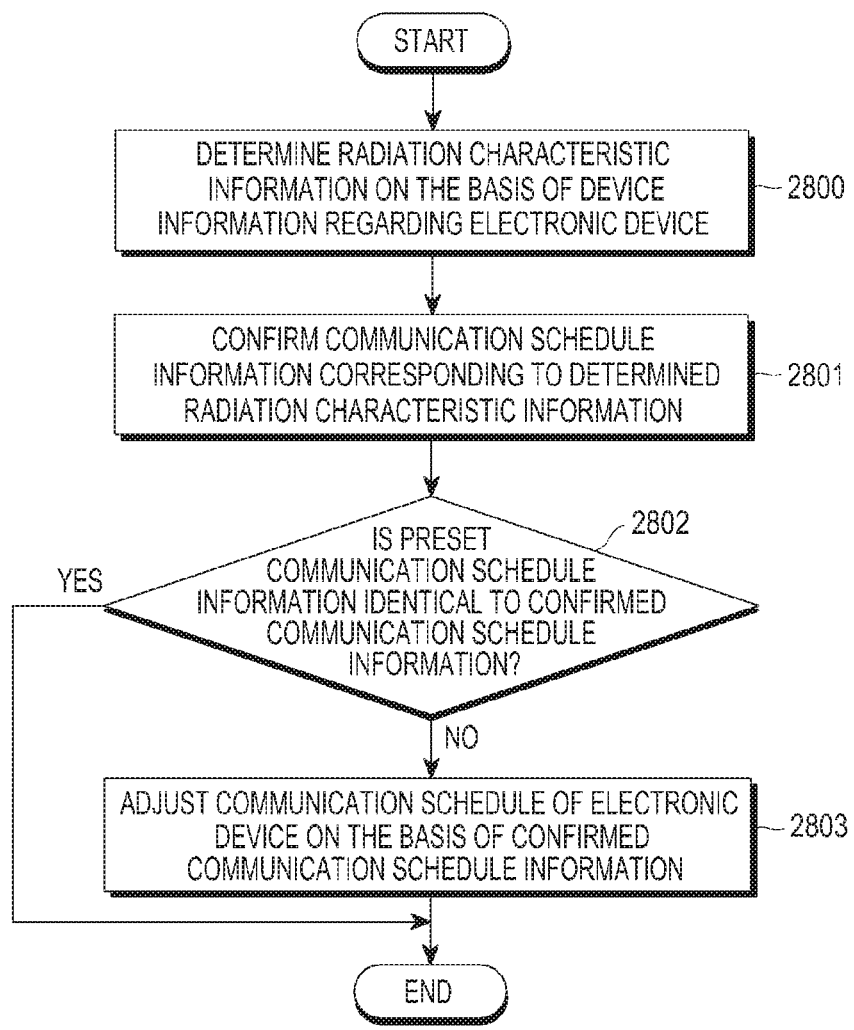
FIG. 28 is a flowchart of a method of adjusting a communication schedule of an electronic device according to an embodiment of the present disclosure.

FIG. 28 is a flowchart of a method of adjusting a communication schedule of an electronic device according to an embodiment of the present disclosure. Steps 2800 to 2803 may be performed through one of an electronic device 101, 104, 201, 400, 500, 1600, or 2600, a server 106 or 410, a processor 120, 210, 401, or 501, a program module 310, at least one wearable device 1610-1, 1610-2, . . . 1610-n, at least one sensor 1620, an external electronic device 1640 or 2610, at least one external device 2631-1, 2631-2, . . . 2631-n, at least one auxiliary sensor 2632, and at least one IoT device 2633.

Referring to FIG. 28, in step 2800, the electronic device 2600 may determine radiation characteristic information based on the device information regarding the electronic device 2600. For example, the electronic device 2600 may determine SAR information, RF-related information including the communication scheme, transmission frequency band information, duplexing scheme information, communication schedule information, and radiation characteristic information regarding the app that is being executed or content that is being executed, etc. from the device information.

In step 2801, the electronic device 2600 may confirm communication schedule information that corresponds to the determined radiation characteristic information. For example, the electronic device 2600 may confirm level information, which corresponds to at least one piece of radiation characteristic information, based on radiation characteristic-wise level setting information, calculate the confirmed level information, and output the calculation result. The processor 2600 may confirm a radiation type, which corresponds to the calculation result regarding the electronic device 2600, based on radiation type-wise communication schedule information and confirm communication schedule information, which corresponds to the confirmed radiation type.

In step 2802, the electronic device 2600 may determine whether preset communication schedule information and confirmed communication schedule information are identical or not and may end the operation, when they are identical, or perform step 2803 when they are not identical.

In step 2803, the electronic device 2600 may adjust the communication schedule of the electronic device 2600 based on the confirmed communication schedule information. For example, the electronic device 2600 may change a current communication schedule to the confirmed communication schedule and may communicate according to the changed communication schedule.

Figure 29:
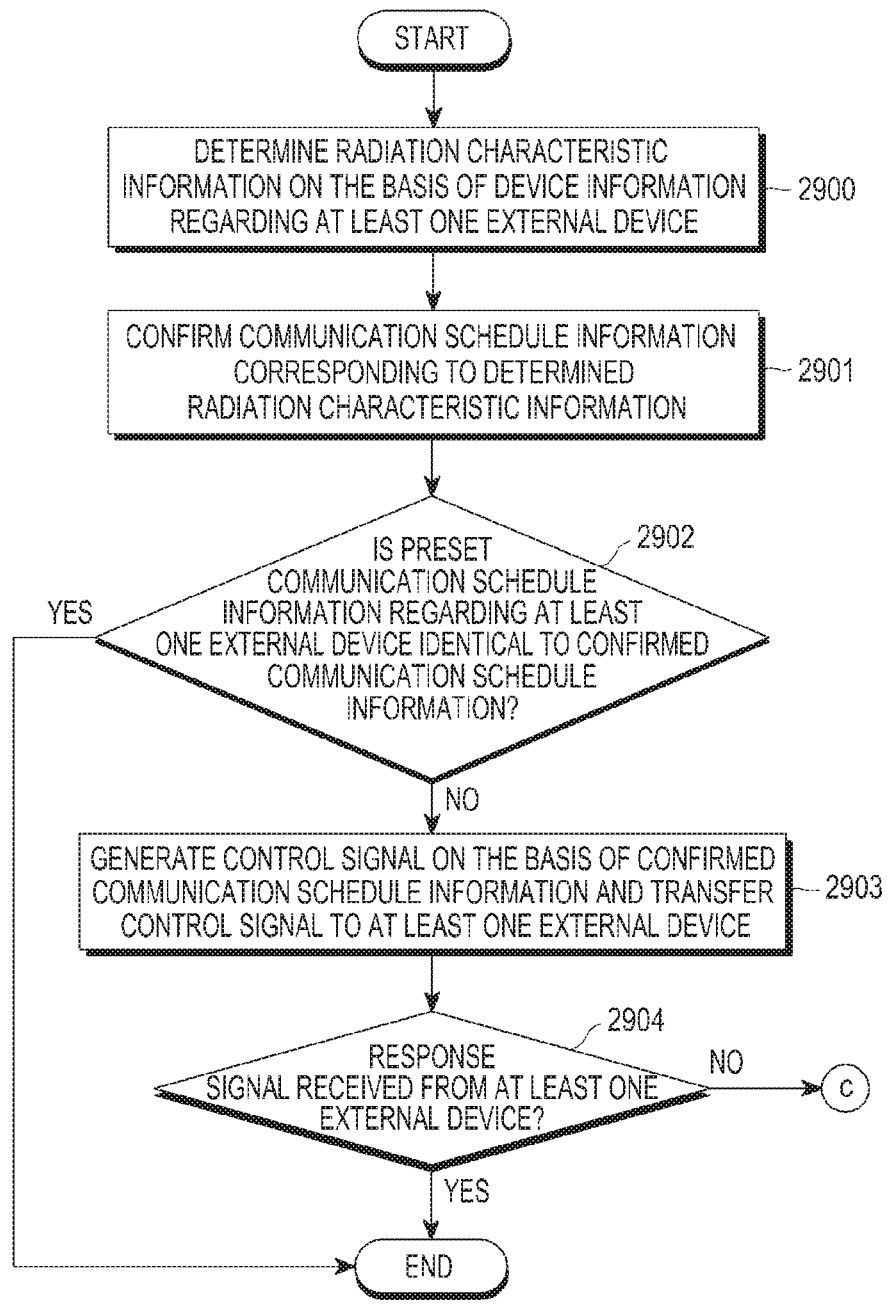
FIG. 29 is a flowchart of a method of adjusting a communication schedule of at least one external device according to an embodiment of the present disclosure.

FIG. 29 is a flowchart of a method of adjusting a communication schedule of at least one external device according to an embodiment of the present disclosure. Steps 2900 to 2904 may be performed through one of an electronic device 101, 104, 201, 400, 500, 1600, or 2600, a server 106 or 410, a processor 120, 210, 401, or 501, a program module 310, at least one wearable device 1610-1, 1610-2, . . . 1610-n, at least one sensor 1620, an external electronic device 1640 or 2610, at least one external device 2631-1, 2631-2, . . . 2631-n, at least one auxiliary sensor 2632, and at least one IoT device 2633.

Referring to FIG. 29, in step 2900, the electronic device 2600 may determine radiation characteristic information based on device information regarding at least one external device.

In step 2901, the electronic device 2600 may confirm communication schedule information that corresponds to the determined radiation characteristic information. For example, the electronic device 2600 may confirm level information, which corresponds to radiation characteristic information regarding at least one external device, based on radiation characteristic-wise level setting information, calculate the confirmed level information, and output the calculation result. The electronic device 2600 may confirm a radiation type, which corresponds to the calculation result regarding the at least one external device, based on radiation type-wise communication schedule information and confirm communication schedule information, which corresponds to the confirmed radiation type.

In step 2902, the electronic device 2600 may determine whether preset communication schedule information regarding the at least one external device and confirmed communication schedule information are identical or not and may end the operation, when they are identical, or perform step 2903 when they are not identical. For example, the electronic device 2600 may determine whether preset communication schedule information regarding the first external device 2631-1 and confirmed communication schedule information regarding the first external device 2631-1 are identical or not. In addition, the electronic device 2600 may determine whether preset communication schedule information regarding the second external device 2631-2 and confirmed communication schedule information regarding the second external device 2631-2 are identical or not.

In step 2903, the electronic device 2600 may generate a control signal based on the confirmed communication schedule information and transfer the same to at least one external device. For example, the electronic device 2600 may generate a control signal for adjusting the communication schedule of the first external device 2631-1 according to the communication schedule information regarding the first external device 2631-1 and may transfer the generated control signal to the first external device 2631-1. In addition, the electronic device 2600 may generate a control signal for adjusting the communication schedule of the second external device 2631-2 according to the communication schedule information regarding the second external device 2631-2 and may transfer the generated control signal to the second external device 2631-2.

In step 2904, the electronic device 2600 may determine whether a response signal is received from the at least one external device or not and may end the operation, when a response signal is received, or perform, in step c, steps 2700 to 2704 of FIG. 27 and steps 2900 to 2904 of FIG. 29 when no response signal is received.

According to an embodiment of the present disclosure, at least one external device (for example, second electronic device) may receive a control signal for adjusting a communication schedule from the electronic device 2600. The at least one external device may compare the current communication schedule with the communication schedule according to the received control signal and may communicate based on a current communication schedule, when the current communication schedule and the communication schedule according to the received control signal are identical, or adjust (or change) the current communication schedule to the communication schedule according to the received control signal, when the current communication schedule and the communication schedule according to the received control signal are not identical, and communicate. The at least one external device may generate a response signal, in response to the control signal, and may transfer the same to the electronic device 2600.

FIGS. 30A to 30E are diagrams illustrating SAR overlapping information, as a result of performing communication between an electronic device and at least one external device, according to an embodiment of the present disclosure.

Figure 30A:
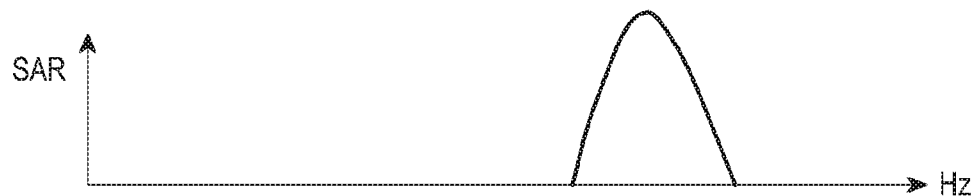
FIGS. 30A to 30E are diagrams illustrating SAR overlapping information, as a result of communicating between an electronic device and at least one external device, according to an embodiment of the present disclosure.

Referring to FIGS. 30A to 30E, when a communication path between an electronic device 2600 and a base station 2620 is activated, a SAR of the electronic device 2600 may be represented in a graph type as illustrated in FIG. 30A.

Figure 30B:
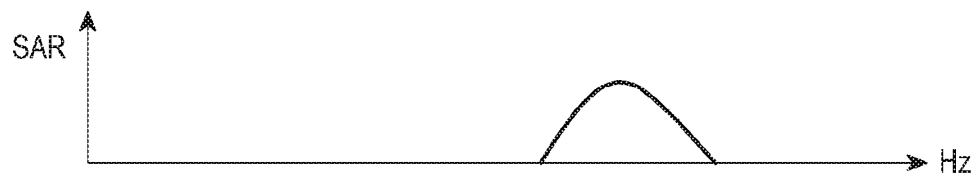

When a communication path between a first external device 2631-1 and at least one of at least one auxiliary sensor 2632 is activated, a SAR of the first external device 2631-1 may be represented in a graph type as illustrated in FIG. 30B.

Figure 30C:
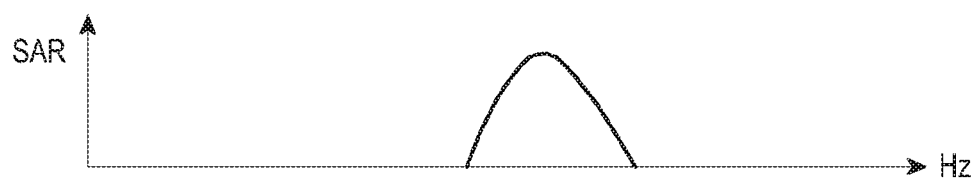

When a communication path between the first external device 2631-1 and a second external device 2631-2 is activated, a SAR of the second external device 2631-2 may be represented in a graph type as illustrated in FIG. 30C.

Figure 30D:
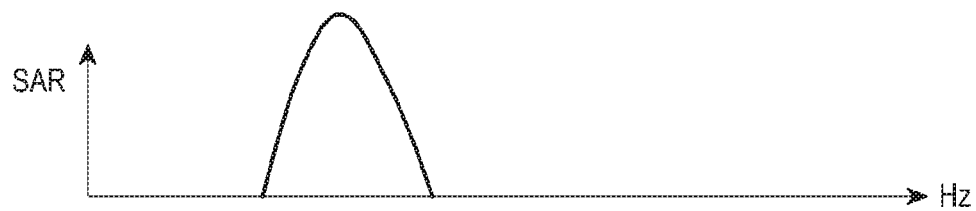

When a communication path between the first external device 2631-1 and the base station 2620 is activated, a SAR of the first external device 2631-2 may be represented in a graph type as illustrated in FIG. 30D.

Figure 30E:
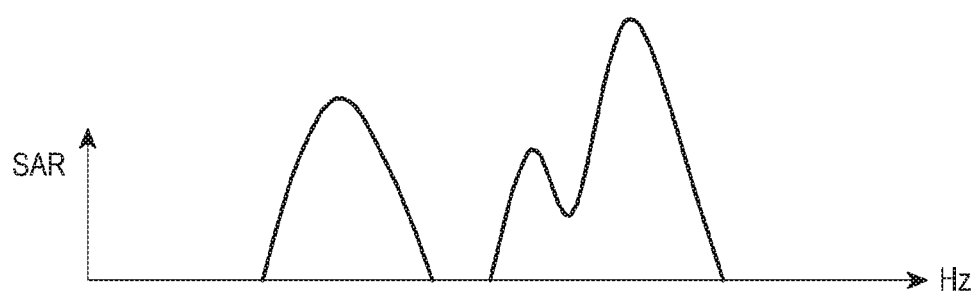

A cumulative SAR (e.g., an accumulation of individual SARs) that follows respective communication paths related to the electronic device 2600 and at least one external device (for example, the base station 2620, the first external device 2631-1, and the second external device 2631-2) may be represented in a graph type as illustrated in FIG. 30E. In such a case, individual SARs overlap according to the communication paths of respective devices; therefore, the cumulative SAR may exceed a preset SAR reference value (for example, 4.0 W/kg).

FIG. 31 is a diagram illustrating radiation characteristic information regarding an electronic device and at least one external device according to an embodiment of the present disclosure.

Referring to FIG. 31, radiation characteristic information regarding an electronic device 2600 and at least one external device (for example, first external device 2631-1, second external device 2631-2, . . . $n^{th}$ external device 2631-n, etc.) may include information such as a SAR, a communication scheme, a duplexing scheme, a TX frequency band, communication schedule information, an application that is being executed, content that is being executed, etc. According to an embodiment of the present disclosure, the communication schedule information may be at least one table including setting information for changing the allocated transmission (TX) time slot or for changing the order of operation of the electronic device 2600.

For example, first radiation characteristic information regarding the electronic device 2600 may include "SAR: 2.04 W/kg, communication scheme: LTE, duplexing scheme: FDD, TX frequency band: 2.5 GHz-2.57 GHz, communication schedule information: fourth table, application being executed: call," where "FDD" stands for frequency division duplexing.

For example, second radiation characteristic information regarding the first external device 2631-1 may include "SAR: 2.01 W/kg, communication scheme: WiFi, duplexing scheme: TDD, TX frequency band: 2.4 GHz, communication schedule information: third table, application being executed: music player, content being executed: music," where "TDD" stands for time division duplexing.

For example, third radiation characteristic information regarding the second external device 2631-2 may include "SAR: 1.47 W/kg, communication scheme: BT, duplexing scheme: TDD, TX frequency band: 2.4 GHz, communication schedule information: first table, application being executed: health care."

According to an embodiment of the present disclosure, the electronic device 2600 may confirm communication schedule information, which corresponds to first radiation characteristic information regarding the electronic device 2600, and may adjust the communication schedule of the electronic device 2600 according to the confirmed communication schedule information.

The electronic device 2600 may confirm communication schedule information, which corresponds to second radiation characteristic information regarding the second external device 2631-1, generate a control signal for controlling the communication schedule of the first external device 2631-1 according to the confirmed communication schedule information, and transfer the same to the first external device 2631-1.

The electronic device 2600 may confirm communication schedule information, which corresponds to third radiation characteristic information regarding the second external device 2631-2, generate a control signal for controlling the communication schedule of the second external device 2631-2 according to the confirmed communication schedule information, and transfer the same to the second external device 2631-2.

Figure 32:
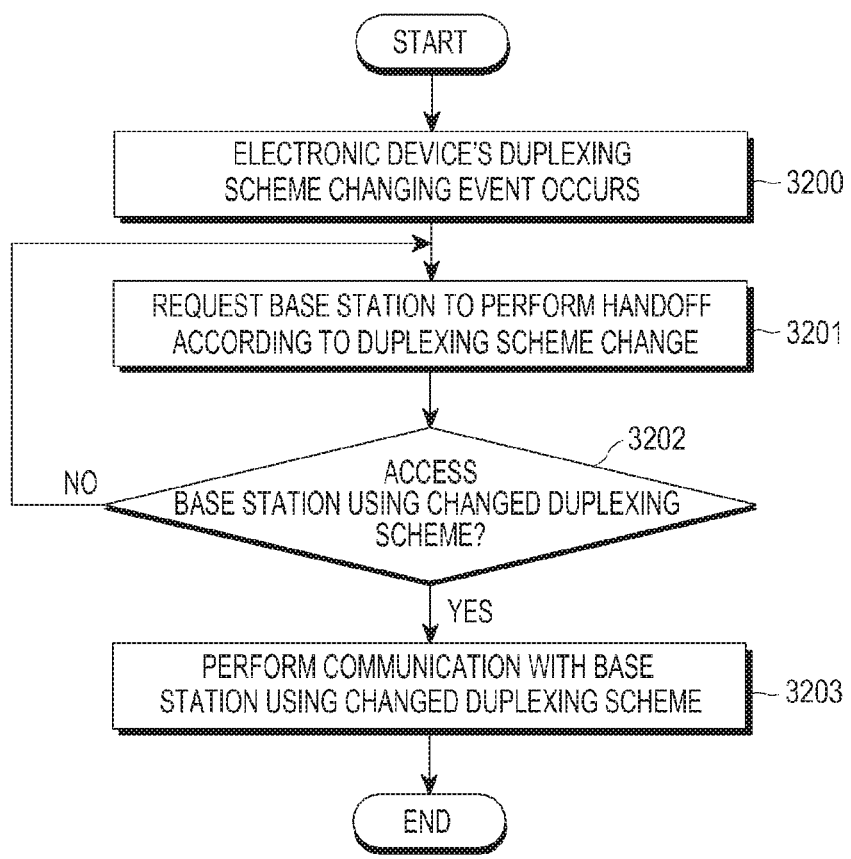
FIG. 32 is a flowchart of a method of changing a communication schedule, as a result of a duplexing scheme change, in connection with an electronic device and at least one external device according to an embodiment of the present disclosure.

FIG. 32 is a flowchart of a method of changing a communication schedule, as a result of a duplexing scheme change, in connection with at least one of an electronic device and at least one external device according to an embodiment of the present disclosure. Steps 3200 to 3203 may be performed through one of an electronic device 101, 104, 201, 400, 500, 1600, or 2600, a server 106 or 410, a processor 120, 210, 401, or 501, a program module 310, at least one wearable device 1610-1, 1610-2, . . . 1610-n, at least one sensor 1620, an external electronic device 1640 or 2610, at least one external device 2631-1, 2631-2, . . . 2631-n, at least one auxiliary sensor 2632, and at least one IoT device 2633.

Referring to FIG. 32, when an event for changing a duplexing scheme of the electronic device 2600 occurs in step 3200, the electronic device 2600 may request the base station 2620 to perform a handoff according to the duplexing scheme change in step 3201.

For example, if the duplexing scheme of preset communication schedule information is FDD, and the duplexing scheme of confirmed communication schedule information is TDD, the electronic device 2600 may transfer a handoff request for changing the duplexing scheme from FDD to TDD to the base station 2620.

In step 3202, the electronic device 2600 may determine whether the base station 2620 is accessed according to the changed duplexing scheme or not and may perform step 3203, when the base station is accessed, or perform step 3201, when the base station is not accessed according to the changed duplexing scheme, and request the base station to conduct a handoff according to the changed duplexing scheme.

In step 3203, the electronic device 2600 may communicate with the base station 2620 according to the changed duplexing scheme. For example, the electronic device 2600 may communicate with the base station 2620 according to the TDD scheme, thereby avoiding SAR overlapping between the electronic device 2600 and at least one external device.

Figure 33A:
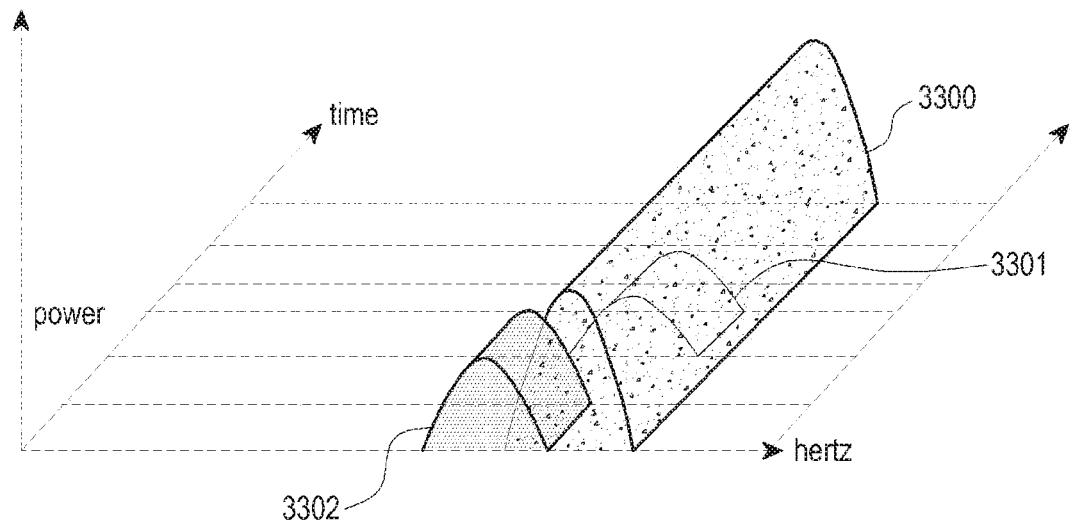
FIGS. 33A and 33B are diagrams illustrating a method of changing a communication schedule, as a result of a duplexing scheme change, in connection with an electronic device and at least one external device according to an embodiment of the present disclosure.
Figure 33B:
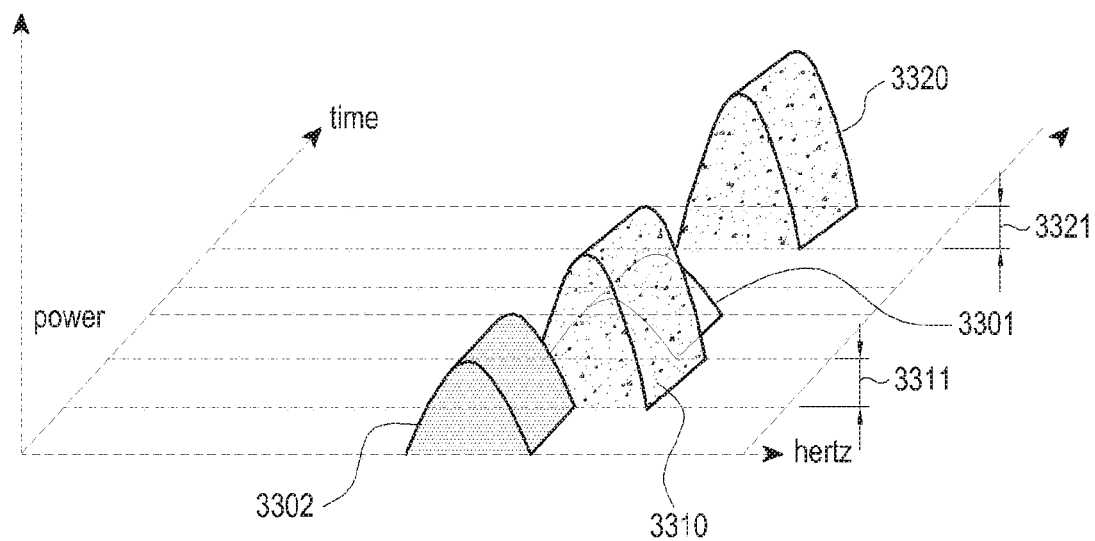

FIGS. 33A and 33B are flowcharts of a method of changing a communication schedule, as a result of a duplexing scheme change, in connection with an electronic device and at least one external device according to an embodiment of the present disclosure.

Referring to FIG. 33A, the electronic device 2600 may communicate with the base station 2620, the first external device 2631-1 may communicate with the base station 2620, and the second external device 2631-2 may communicate with at least one IoT device.

According to an embodiment of the present disclosure, when the electronic device 2600, the first external device 2631-1, and the second external device 2631-2 communicate using the same communication frequency band or similar communication frequency bands, the communication power (or radiation power) 3300 of the electronic device 2600, the communication power 3301 of the first external device 2631-1, and the communication power 3302 of the second external device 2631-2 may overlap as illustrated in FIG. 33A.

This may increase a cumulative SAR, which is related to the individual SARs that follow the communication power (or radiation power) of the electronic device 2600, the first external device 2631-1, and the second external device 2631-2.

In this case, the electronic device 2600 may change the duplexing scheme from FDD to TDD such that, as illustrated in FIG. 33B, the communication power of the electronic device 2600 is distributed into time zones 3311 and 3321, in which the communication power of the first external device 2631-1 and the communication power of the second external device 2631-2 do not overlap. This may avoid overlapping among the communication power (or radiation power) 3320 of the electronic device 2600, the communication power 3310 of the first external device 2631-1, and the communication power 3302 of the second external device 2631-2, thereby reducing the entire SAR.

Figure 34:
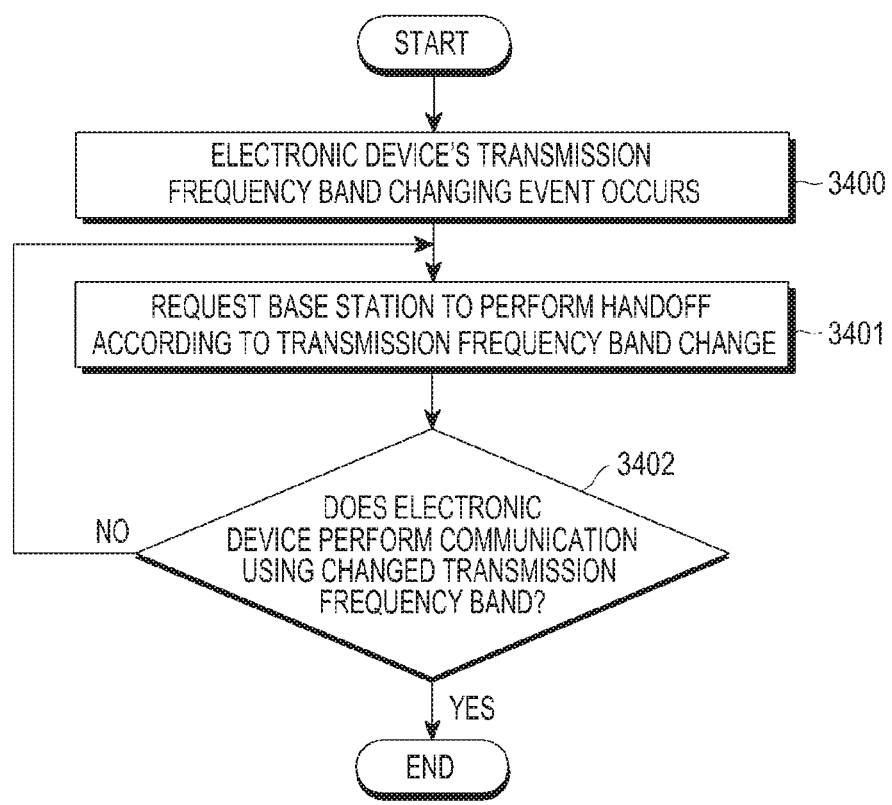
FIG. 34 is a flowchart of a method of changing a communication schedule, as a result of a transmission frequency band change, in connection with an electronic device and at least one external device according to an embodiment of the present disclosure.

FIG. 34 is a flowchart of a method of changing a communication schedule, as a result of a transmission frequency band change, in connection with an electronic device and at least one external device according to an embodiment of the present disclosure. Step 3400 to 3402 may be performed through one of an electronic device 101, 104, 201, 400, 500, 1600, or 2600, a server 106 or 410, a processor 120, 210, 401, or 501, a program module 310, at least one wearable device 1610-1, 1610-2, . . . **1610-*n*, at least one sensor 1620, an external electronic device 1640 or 2610, at least one external device 2631-1, 2631-2, . . . 2631-*n*, at least one auxiliary sensor 2632, and at least one IoT device 2633**.

Referring to FIG. 34, when an event for changing the transmission frequency band of the electronic device 2600 occurs in step 3400, the electronic device 2600 may request the base station 2620 to perform a handoff according to the transmission frequency band change in step 3401.

For example, if the transmission frequency band of preset communication schedule information is band 7 (for example, 2.6 GHz), and the transmission frequency band of confirmed communication schedule information is band 5 (for example, 850 MHz), the electronic device 2600 may transfer a handoff request for changing the transmission frequency band from band 7 to band 5 to the base station 2620.

In step 3402, the electronic device 2600 may communicate with the base station 2620 in the changed transmission frequency band. For example, the electronic device 2600 may communicate with the base station 2620 in band 5, thereby avoiding SAR overlapping between the electronic device 2600 and at least one external device.

Figure 35A:
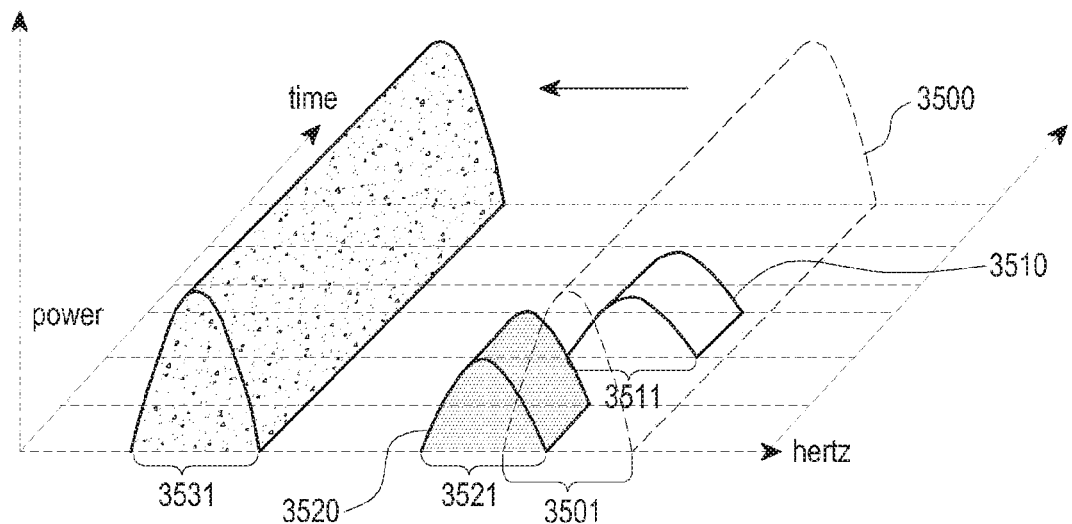
FIGS. 35A and 35B are diagrams illustrating a method of changing a communication schedule, as a result of a transmission frequency band change, in connection with an electronic device and at least one external device according to an embodiment of the present disclosure.
Figure 35B:
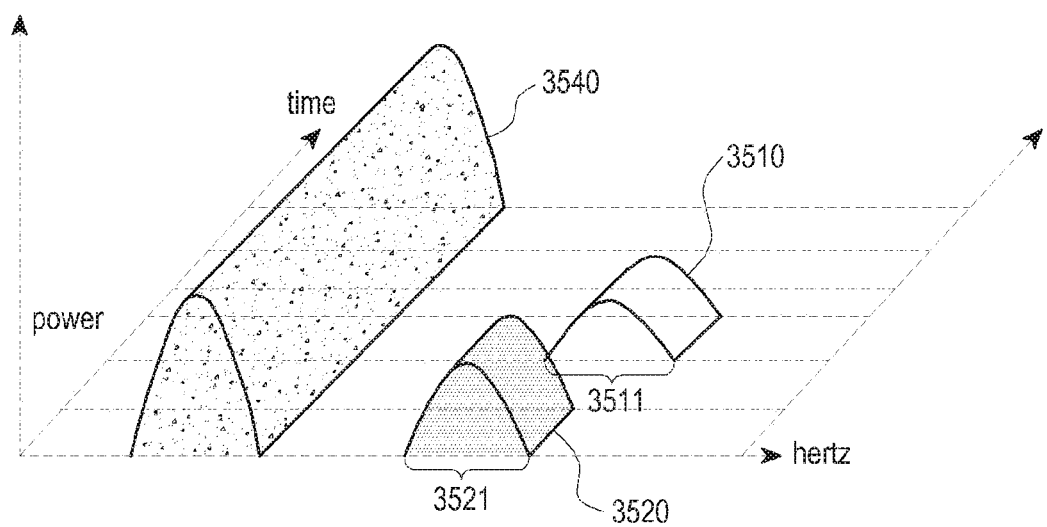

FIGS. 35A and 35B are diagrams illustrating a method of changing the communication schedule, as a result of a transmission frequency band change, in connection with an electronic device and at least one external device according to an embodiment of the present disclosure.

Referring to FIG. 35A, the electronic device 2600 may communicate with the base station 2620 in a first frequency band 3511, the first external device 2631-1 may communicate with the base station 2620 in a second frequency band 3511, and the second external device 2631-2 may communicate with at least one Internet-of-things device in a third frequency band 3521.

According to an embodiment of the present disclosure, when the electronic device 2600, the first external device 2631-1, and the second external device 2631-2 perform respective communications using the same communication frequency band or similar communication frequency bands, the communication power (or radiation power) 3500 of the electronic device 2600, the communication power 3510 of the first external device 2631-1, and the communication power 3520 of the second external device 2631-2 may overlap as illustrated in FIG. 35A.

This may increase a cumulative SAR, which is related to individual SARs that follow the communication power (or radiation power) of the electronic device 2600, the first external device 2631-1, and the second external device 2631-2.

In this case, the electronic device 2600 may change the transmission frequency band of the electronic device 2600 from the first frequency band (for example, band 7) 3501 to the fourth frequency band (for example, band 5) 3531, as illustrated in FIG. 35B, thereby avoiding overlapping among the communication power (or radiation power) 3540 of the electronic device 2600, the communication power 3510 of the first external device 2631-1, and the communication power 3520 of the second external device 2631-2. This may reduce the cumulative SAR of the electronic device 2600, the first external device 2631-1, and the second external device 2631-2.

According to an embodiment of the present disclosure, when the cumulative SAR value is increased by communication power overlapping between the electronic device 2600 and at least one external device, or when the state of communication between the electronic device 2600 and the at least one external device deviates from a certain value (for example, bit error rate (BER), signal to noise rate (SNR)), communication between the electronic device 2600 and the at least one external device may be limited for the sake of the overall communication flow.

For example, the radiation characteristic information regarding the electronic device 2600 may be "SAR: 2.13 W/kg, application that is being executed: call"; the radiation characteristic information regarding the first external device 2631-1 may be "SAR: 2.01 W/kg, application that is being executed: music player"; and the radiation characteristic information regarding the second external device 2631-2 may be "SAR: 1.47 W/kg, application that is being executed: health care." In this case, the first external device 2631-1 reproduces streaming content through a music player; therefore, the electronic device 2600 may transfer a control signal for limiting the transmission function to the first external device 2631-1 such that the first external device 2631-1 is controlled to perform the reception function only. When the control signal for limiting the transmission function is received, the first external device 2631-1 may not perform the transmission function, but perform the reception function only.

The electronic device 2600 may transfer a certain signal (for example, a trigger signal) for releasing a limit on the transmission function to the first external device 2631-1 such that the external device 2631-1 is controlled to perform the transmission function.

When the control signal for releasing a limitation on the transmission function is received, the first external device 2631-1 may perform both transmission and reception functions.

According to an embodiment of the present disclosure, the electronic device 2600 may transfer a control signal for limiting a transmission function for a predetermined period of time such that the first external device 2631-1 is controlled not to perform the transmission function for the predetermined period of time and, after the predetermined period of time is over, to perform both transmission and reception functions.

As such, in an embodiment of the present disclosure, the SAR value, which follows the communication power of an electronic device, may be adjusted in view of SAR suitability for each individual user.

In an embodiment of the present disclosure, it is possible to adjust a cumulative SAR value, which follows overlapping of communication power of an electronic device and communication power resulting from at least one external device.

In an embodiment of the present disclosure, it is possible to confirm peripheral users, who are influenced by the SAR, and to assign different weights to the confirmed peripheral users, thereby adjusting a communication power for each peripheral user, such that a SAR value for each individual user may be adjusted.

The term "module" as used herein includes a unit that includes hardware, software, or firmware and may be used interchangeably with the term, for example, "logic," "logical block," and "circuit." The term "module" may refer to an integrated part, or a minimum unit for performing one or more functions or a part thereof. The term "module" may refer to a device that may be mechanically or electronically implemented and may include, for example, an application specific integrated circuit (ASIC), a field programmable gate array (FPGA), or a programmable-logic device, which is known or will be developed in the future, for performing certain operations. At least some of devices (e.g., modules or functions thereof) or methods (e.g., steps) according to an embodiment of the present disclosure may be implemented by an instruction which is stored a non-transitory computer-readable storage medium (e.g., the memory 130) in the form of a program module. An instruction, when executed by a processor (e.g., the processor 120), may cause one or more processors to execute the function corresponding to the instruction. The non-transitory computer-readable storage medium may include a hard disk, a floppy disk, a magnetic medium (e.g., a magnetic tape), an optical media (e.g., a compact disk read only memory (CD-ROM), DVD), a magneto-optical media (e.g., a floptical disk), an internal memory, etc. An instruction may include code which is generated by a compiler or code which may be executed by an interpreter. A programming module according to the present disclosure may include one or more of the aforementioned components or may further include other additional components, or some of the aforementioned components may be omitted. Operations performed by a module, a programming module, or other elements according to an embodiment of the present disclosure may be executed sequentially, in parallel, repeatedly, or in a heuristic manner. At least some operations may be executed according to another sequence, may be omitted, or may further include other operations.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a wireless communication circuit;
   a memory; and
   at least one processor,
   wherein the at least one processor is configured to:
   obtain at least one piece of state information that indicates a state of a user,
   identify at least one piece of specific absorption rate (SAR) characteristic information, which is related to a SAR, based on the at least one piece of state information,
   identify a level corresponding to the at least one piece of SAR characteristic information based on SAR characteristic-wise level setting information stored in the memory,
   calculate a result value of the level based on SAR type-wise communication power setting information stored in the memory,
   identify a SAR type corresponding to the result value of the level,
   identify communication power information corresponding to the SAR type, and
   adjust communication power of the wireless communication circuit based on the communication power information, and
   wherein the at least one piece of state information comprises at least one of health information that indicates a health state of the user, and situation information that indicates a situation of the user.

2. The electronic device of claim 1, wherein the SAR characteristic-wise level setting information includes at least one level corresponding to at least one threshold measurement range with regard to each of at least one SAR characteristic,
   wherein the SAR type-wise communication power setting information includes SAR type-wise communication power information corresponding to at least one threshold calculation result range.

3. The electronic device of claim 1, wherein the at least one processor is further configured to adjust the communication power, if preset communication power information and the communication power information are compared and found not to be identical, based on the communication power information.

4. A method of operating an electronic device, the method comprising:
   storing specific absorption rate (SAR) characteristic-wise level setting information and SAR type-wise communication power setting information in a memory;
   obtaining at least one piece of state information that indicates a state of a user;
   identifying at least one piece of SAR characteristic information, which is related to a SAR, based on the at least one piece of state information;
   identifying a level corresponding to the at least one piece of SAR characteristic information based on the SAR characteristic-wise level setting information;
   calculating a result value of the level based on the SAR type-wise communication power setting information;
   identifying a SAR type corresponding to the result value of the level;
   identifying communication power information corresponding to the identified SAR type; and
   adjusting communication power of the wireless communication circuit based on the communication power information,
   wherein the at least one piece of state information comprises at least one of health information that indicates a health state of the user and situation information that indicates a situation of the user.

5. The method of claim 4, wherein the SAR characteristic-wise level setting information includes at least one level corresponding to at least one threshold measurement range with regard to each of at least one SAR characteristic, and
   wherein the SAR type-wise communication power setting information includes SAR type-wise communication power information corresponding to at least one threshold calculation result range.

6. The method of claim 4, further comprising:
   identifying a level corresponding to the at least one piece of SAR characteristic information based on the SAR characteristic-wise level setting information;
   obtaining a calculation result value of the identified level;
   identifying a SAR type corresponding to the calculation result value based on the SAR type-wise communication power setting information; and
   identifying the communication power information corresponding to the identified SAR type.

7. The method of claim 4, further comprising:
   adjusting the communication power, if preset communication power information and the identified communication power information are compared and found not to be identical, based on the identified communication power information.

\* \* \* \* \*